(12) United States Patent
Fujimoto et al.

(10) Patent No.: US 6,222,581 B1
(45) Date of Patent: Apr. 24, 2001

(54) PICTURE READING/WRITING HEAD AND INTEGRATED CIRCUIT USED FOR THE SAME

(75) Inventors: Hisayoshi Fujimoto; Hiroaki Onishi, both of Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/230,676

(22) PCT Filed: Jul. 29, 1997

(86) PCT No.: PCT/JP97/02642

§ 371 Date: Jan. 29, 1999

§ 102(e) Date: Jan. 29, 1999

(87) PCT Pub. No.: WO98/05158

PCT Pub. Date: Feb. 5, 1998

(30) Foreign Application Priority Data

Jul. 30, 1996 (JP) .................................................. 8-200143
Sep. 2, 1996 (JP) .................................................. 8-231581
Oct. 14, 1996 (JP) .................................................. 8-270627
Jun. 27, 1997 (JP) .................................................. 9-171337

(51) Int. Cl.[7] ........................................................ B41J 27/00
(52) U.S. Cl. ........................... 347/256; 347/241; 358/401; 358/472
(58) Field of Search ............................ 347/242, 243, 347/244, 256, 241, 257, 123; 358/401, 296, 497, 494, 472; 250/208.1; 399/361, 365, 381

(56) References Cited

U.S. PATENT DOCUMENTS 4,467,333 * 8/1984 Seimiya et al. ........................ 347/123
4,706,128   11/1987 Hiroshi et al. ......................... 358/473
4,724,490    2/1988 Hiroshi .................................. 358/401
4,868,669    9/1989 Hideyuki .............................. 358/400
5,162,916 * 11/1992 Stemmle et al. ...................... 358/296
5,280,364    1/1994 Osamu et al. ........................ 358/400
5,902,993 *  5/1999 Okushiba et al. ................. 250/208.1

FOREIGN PATENT DOCUMENTS

| 0 074719 | 3/1983 | (EP) . |
| 0 323 183 | 7/1989 | (EP) . |
| 0 596 664 | 5/1994 | (EP) . |
| 0 653 876 | 5/1995 | (EP) . |
| 61-152160 | 7/1986 | (JP) . |
| 2-36258 | 3/1990 | (JP) . |
| 3-70459 | 7/1991 | (JP) . |
| 4-282952 | 10/1992 | (JP) . |
| 6-86010 | 3/1994 | (JP) . |
| 6-319013 | 11/1994 | (JP) . |
| 9-33067 | 6/1995 | (JP) . |
| 8-184916 | 7/1996 | (JP) . |

* cited by examiner

*Primary Examiner*—N. Le
*Assistant Examiner*—Hai C. Pham
(74) *Attorney, Agent, or Firm*—Merchant & Gould P.C.

(57) ABSTRACT

An image reading/writing head (1) includes an integrated circuit for reading (10) provided with a plurality of light receiving elements for reading an image on a document (D) by receiving, via optical lenses (12), light reflected by the document placed on an image reading surface provided in a surface of a casing (2); a plurality of heating elements (9) disposed in a surface different from the reading surface in the casing (2) for forming an image on recording paper by heat; and an integrated circuit for writing (11) for controlling these heating elements (9). The integrated circuit for reading (10), the heating elements (9) and the integrated circuit for writing (11) are provided in a main surface of a substrate (7) held by the casing (2), and light reflecting member (13) is provided for making the light after passing the optical lenses (12) enter the light receiving elements.

13 Claims, 21 Drawing Sheets

PICTURE READING/WRITING HEAD AND INTEGRATED CIRCUIT USED FOR THE SAME

TECHNICAL FIELD

The present invention relates to an image reading/writing head capable of reading and printing an image by means of thermal-transfer or thermosensible method.

BACKGROUND OF THE INVENTION

An image processing apparatus such as a facsimile machine is commonly provided with an image sensor for reading an image, and a thermal printhead for recording an image which is received or read by the above image sensor on heat-sensitive paper for example.

If there is a reading/writing head capable of reading the image and recording the image on paper for the image processing apparatus, the facsimile machine will be assembled with fewer parts and components, the head will occupy a smaller space, and therefore the facsimile machine will be more compact.

Such a reading/writing head is already disclosed in the Japanese Patent Publication No. 6-319013. According to the reading/writing head disclosed in this publication, image sensing is achieved through an image reading surface provided at an upper surface of a casing, where light is reflected to pass through a rod lens array to focus on light receiving elements provided in an upper surface of an element-mounting substrate disposed in a bottom surface of a substrate. On the other hand, a thermal printhead function is achieved by an array of heating elements provided in a lower surface of a heating element formation substrate disposed adjacently to the element-mounting substrate on a bottom surface of a casing, whereas drive IC's for driving these heating elements are mounted on a lower surface of the element-mounting substrate.

However, the image reading/writing head according to the above arrangement has the following problems which must be solved.

First, the element-mounting substrate has one surface for mounting the light receiving elements for the image sensor, and the other surface for mounting the drive IC's for the thermal printhead. Because of such an arrangement, this element-mounting substrate is extremely difficult to manufacture. Specifically, this element-mounting substrate must be formed with a very fine wiring pattern in each of the two surfaces. Further, this element-mounting substrate must be mounted with elements by means of chip bonding and wire bonding in each of the two surfaces, and thus it is extremely difficult to smoothly perform such manufacturing operations today.

Second, the substrate for mounting the elements is prepared separately from the substrate in which the heating elements are formed. This increases the number of parts and assembling steps, raising cost of the image reading/writing head.

Third, the distance from the image reading surface to the light receiving elements is set to a so-called conjugated length of the rod lens array. This makes it impossible to further reduce the thickness of the head.

Fourth, the light receiving elements for the image sensor are separated from the drive IC's for the thermal printhead, raising the cost of the head.

It is therefore an object of the present invention to provide an image reading/writing head which can be manufactured more easily.

Another object of the present invention is to provide an image reading/writing head comprising a fewer number of parts.

Another object of the present invention is to provide an image reading/writing head having smaller outside dimensions.

Still another object of the present invention is to provide an integrated circuit suitable for the image reading/writing head.

OUTLINE OF THE INVENTION

An image reading/writing head provided by a first aspect of the present invention comprises an integrated circuit for reading provided with a plurality of light receiving elements for reading an image on a document by receiving, via optical lenses, light reflected by the document placed on an image reading surface provided in a surface of a casing; a plurality of heating elements disposed in a surface different from the reading surface in the casing for forming an image on recording paper by heat; and an integrated circuit for writing for controlling these heating elements.

The integrated circuit for reading, the heating elements and the integrated circuit for writing are provided in a main surface of a substrate held by the casing. Further light reflecting means are provided for making the light after passing the optical lenses enter the light receiving elements.

Specifically, according to this image reading/writing head, the image reading surface and the heating elements are disposed in different surfaces in the casing, yet the heating elements, the integrated circuit for writing for controlling the heating elements, and the integrated circuit for reading provided with light receiving elements are provided in the same single main surface of a single substrate. Further, the light reflecting means are provided for making the reflected light from the document enter the light receiving elements in the integrated circuit for reading provided in the substrate. Specifically, the reflected light from the document passes through the optical lenses, and then directed by the reflecting means for entering the light receiving elements.

According to this image reading/writing head, the integrated circuit for reading and the integrated circuit for writing are mounted basically in one main surface of one substrate. Thus, it becomes possible to use a substrate, formed with a wiring pattern only in one surface, on which formation of the heating elements, bonding of each integrated circuit and necessary wirebonding can be made. As a result, the manufacturing process can be significantly simplified as compared to the arrangement in which integrated circuits must be mounted in both surfaces of the substrate.

Further, the reflected light from the image reading surface is re-directed by the reflecting means before entering the light receiving elements. Thus, even if a selfoc lens array is used as the optical lenses, it becomes possible to make the thickness of the casing smaller than the conjugated length of the rod lens array. This contributes greatly to size reduction of this reading/writing head.

According to a preferred embodiment, a clock signal for the integrated circuit for reading and a clock signal for the integrated circuit for writing are the same clock signal.

With such an arrangement, compared with the case where separate clock signals are supplied respectively to the integrated circuit for reading and the integrated circuit for writing, a fewer number of pins can be needed for a connector for supplying clock signals from outside of the image reading/writing head to the wiring pattern of the substrate, making it possible to reduce the size of the connector.

According to the preferred embodiment, a direction in which read image signals are transferred in the integrated circuit for reading is the same as a direction in which image data for recording are transferred in the integrated circuit for writing. With this arrangement, the image can be properly formed on the recording paper when copying the document in which occasion the read image signals are converted into binary information as image data for recording.

With such an arrangement, in the image reading/writing head in which a plurality of integrated circuits for reading and a plurality of integrated circuits for writing are mounted in parallel to the heating elements, when read image signals from the integrated circuits for reading are converted into binary information as image data for recording, and then supplied to the integrated circuits for writing, the recorded image is not a mirror image in which left-hand side and the right-hand side of the original image are vise-versa.

Specifically, the image reading writing head is likely to be used in such a way that the document to be read and the recording paper are fed in a same direction, and when copying, the surface of the document is opposed to the recording surface, with the image reading/writing head sandwiched in between. On the other hand, in the plurality of integrated circuits for reading, signals of the read image are outputted successively for each line starting from the first bit of the first-stage reading circuit. After conversion into binary data, the image data for writing are stored successively starting from the last bit of the final-stage writing circuit. This is because the data for writing entered serially to the first bit of the shift register of the first-stage writing circuit is successively forwarded toward the last bit of the shift register of the final-stage writing circuit. Given the condition that the document surface is opposed to the recording surface, if the reading for the first bit of the first-stage reading circuit is made for the left-end of the document, the left end of the recording paper corresponds to the last bit of the final-stage writing circuit. Therefore, if the read image signal from the first bit of the first-stage reading circuit is converted into binary signal as the image data for writing and is stored in the last bit of the final-stage writing circuit, then a correct image which is not a mirror image can be obtained. At this time, the read image signals are forwarded from the first bit of the first-stage reading circuit toward the last bit of the final-stage reading circuit, whereas the image data for writing are forwarded from the first bit of the first-stage writing circuit toward the last bit of the final-stage writing circuit, i.e. the data transfer directions are the same.

According to the preferred embodiment, the integrated circuit for reading and the integrated circuit for writing are integrated into a single chip.

With such an arrangement, light receiving elements, the controlling circuit for the same, and the controlling circuit for the heating elements are integrated into a single chip. As a result, compared to the case in which the integrated circuit for reading and the integrated circuit for writing are prepared separately and mounted separately from the other, the chip will occupy a smaller area in the substrate, making it possible to reduce the area of the substrate for further reduction in the size of the image reading/writing head.

Still further, according to the preferred embodiment, the heating elements provided in the substrate supported by the casing is backed from behind the substrate by a heat absorbing member made of material having a greater thermal conductivity than of the casing.

With such an arrangement, heat from the heating elements quickly moves to the heat absorbing member, preventing the substrate from becoming excessively hot, effectively making it possible to avoid characteristic changes in the light receiving elements, deformation of or damage to the substrate resulting from the heat. It should be noted that according to the present invention, the heating elements, the integrated circuit for writing for controlling the heating elements, and the integrated circuit for reading provided with light receiving elements are provided in one main surface of the substrate as has been described earlier. Thus, the other surface may not be mounted with any wiring patterns or electronic components, and therefore a large area of this other surface of the substrate can be contacted to the heat absorbing member, making it possible to effectively prevent the overheating of the substrate.

According to the preferred embodiment, the optical lenses are a selfoc lens array. According to another preferred embodiment, the optical lenses are a plurality of aspherical lenses. If the selfoc lens array is used, an image of a line out of the document is formed on the light receiving elements without magnification nor inversion. This arrangement is common in so called contact-type image sensor, and is easily carried out in practice. If the plurality of aspherical lenses are used as the optical lenses, each of the aspherical lens is disposed in correspondence with an integrated circuit or reading, and an inverted image of a line out of the document is formed in predetermined length of fractions on the light receiving elements. Further, by making a distance from the optical lenses to the image reading surface different from a distance from the optical lenses to the light receiving elements, the image can be formed within a line shorter than the actual reading line. As a result, it becomes possible to reduce the size of each integrated circuit for reading for reduced cost.

According to the preferred embodiment, the light after passing the optical lenses is reflected one time by the reflecting means so the light enters the light receiving elements at an angle. Further, according to another preferred embodiment, the light after passing the optical lenses is reflected for a plurality of times by the reflecting means before entering the light receiving element vertically or generally vertically. As described above, as far as there is enough distance from the optical lenses, the angle of incidence to the light receiving elements can be selected as desired. Preferably however, the light should enter vertically for the best efficiency of the light receiving elements.

The reflecting means may be one or a plurality of mirror surfaces, or a prism. The mirror surface can be formed by evaporating or spattering a metal in an inner surface of a cover member which is a separate member from the casing. The cover member covers the integrated circuit for reading and the integrated circuit for writing mounted on the substrate.

According to another preferred embodiment, the prism is made of a molded transparent resin fitted into a cover member which covers the integrated circuit for reading and the integrated circuit for writing mounted on the substrate.

An integrated circuit for an image reading/writing head provided by a second aspect of the present invention comprises a plurality of light receiving elements for reading an image on the document by receiving light reflected by the document, and a plurality of heating elements for forming an image on recording paper by heat.

The plurality of light receiving elements, a light receiving element controlling circuit for successively taking outputs from the plurality of light receiving elements, and a controlling circuit for the plurality of heating elements are formed in a single chip.

According to this integrated circuit for the reading/writing head, the plurality of light receiving elements, the light receiving element controlling circuit and the controlling circuit for the plurality of heating elements are formed in a single chip. Therefore, in comparison with the case where the light receiving elements, the integrated circuit for light receiving element controlling circuit, and the integrated circuit for heating element controlling circuit are provided separately, a smaller space is needed on the substrate for mounting. In addition, supply of power and the clock signals may not be made individually to the different kinds of integrating circuits. This saves wiring pattern on the substrate, making it possible to reduce the size of the substrate, leading to size reduction of the image reading/writing head. Further, there is no need for manufacturing the integrated circuit for reading separately from the integrated circuit for writing. This makes it possible to reduce manufacturing cost of the integrated circuits, reducing steps such as for chip-bonding and wiring pattern formation, making it possible to manufacture the image reading/writing head at a low cost.

According to the preferred embodiment, the plurality of light receiving elements are disposed on a surface of the chip closer to a side edge, whereas all the pads for signals and power supply are disposed on the surface of the chip closer to the other side edge.

With such an arrangement, when pads are wirebonded to the wiring pattern on the substrate, the wires can be positively prevented from shading light from the light receiving elements.

According to the preferred embodiment, a clock signal for the integrated circuit for reading and a clock signal for the integrated circuit for writing are the same clock signal.

Such an arrangement can reduce the wiring pattern on the substrate, making it easier to provide the wiring pattern, as well as making it possible to reduce the size of substrate.

Other features and advantages of the present invention should become clearer from the following detailed description to be made below with reference to the accompanying drawings.

BEST MODE FOR CARRYING OUT THE INVENTION

Now, preferred embodiments of the present invention will be described in specific detail with reference to the accompanying drawings.

Figure 1:
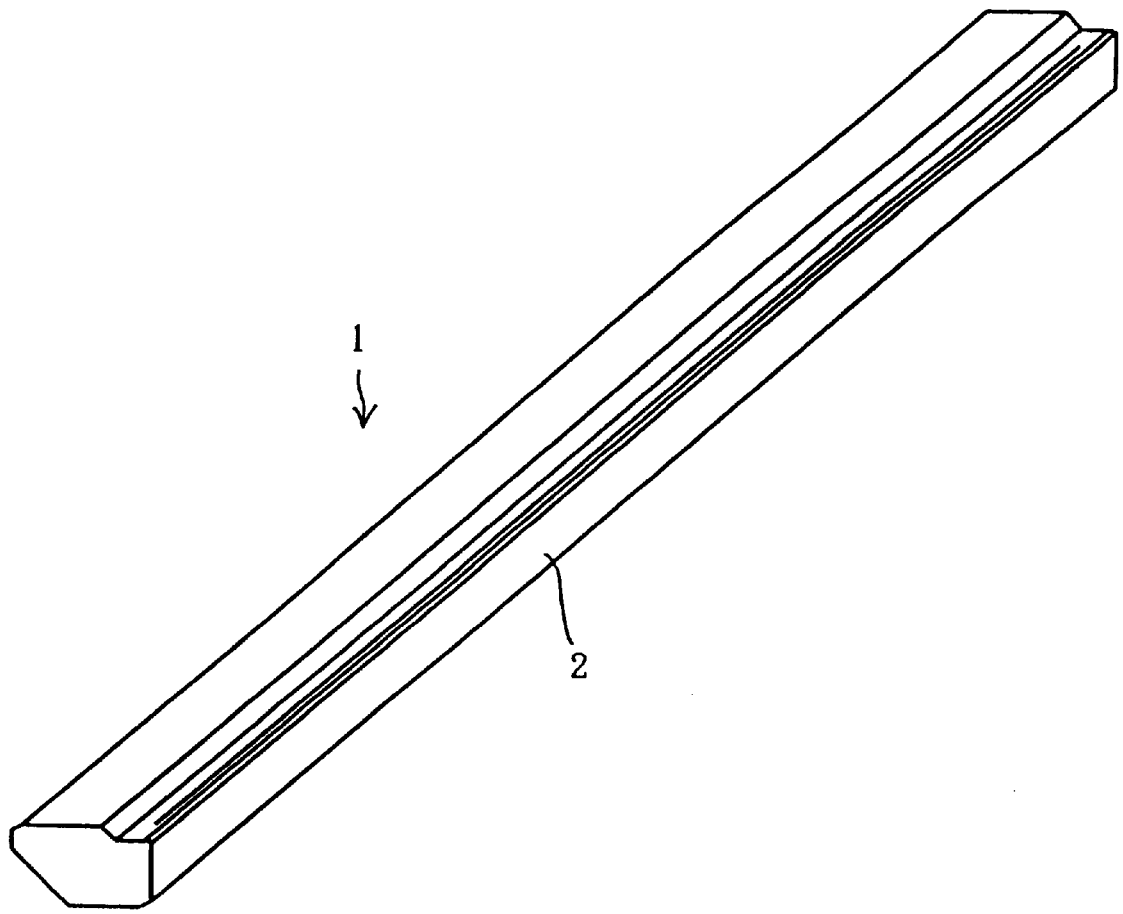
FIG. 1 is a perspective outline view of an image reading/writing head as a first embodiment of the present invention.
Figure 2:
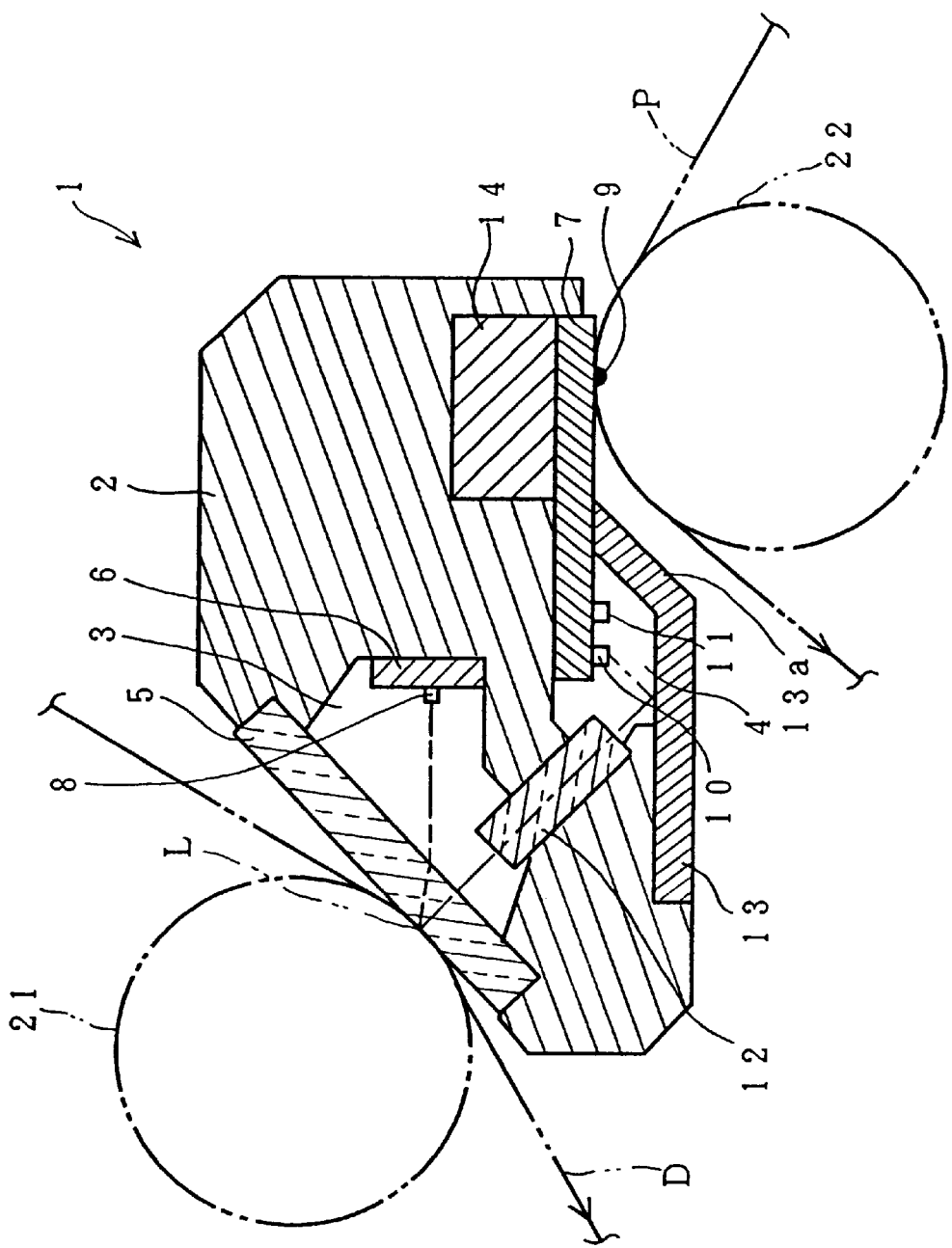
FIG. 2 is a sectional view of the image reading/writing head shown in FIG. 1 taken in a line vertical to a longitudinal axis of the image reading/writing head.

FIGS. 1 through 10 show an image reading/writing head 1 as a first embodiment of the present invention. FIG. 1 is a perspective outline view of the image reading/writing head 1. FIG. 2 is a sectional view of the image reading/writing head taken in a line transverse to a longitudinal axis of the image reading/writing head 1. This image reading/writing head 1 comprises a casing 2 having a predetermined longitudinal dimension. As clearly shown in FIG. 2, the casing 2 except for two end portions thereof is formed with a first recess 3 and a second recess 4. The first recess 3 is sealed by a cover glass 5. The first recess 3 is mounted with a first substrate 6, whereas the second recess 4 is mounted with a second substrate 7.

The first substrate 6 has a first main surface mounted with a plurality of LED chips 8 at a predetermined longitudinal interval as a light source. The first substrate 6 has a second main surface supported by the casing 2. The second substrate 7 has a first surface formed with a plurality of heating elements 9 disposed in a row along and closer to a longitudinal edge. The first surface of the second substrate further includes integrated circuits for reading 10 (hereinafter called "sensor IC's") and integrated circuits for writing 11 (hereinafter called "drive IC's") along and closer to another longitudinal edge. The casing 2, is formed with an injection-molded heat absorbing member 14 having a generally square section. The heat absorbing member 14 contacts generally half of a second main surface of the second substrate 7.

The casing 2 is formed with a communicating space connecting the first recess 3 with the first recess 4. This communicating space is fitted with a selfoc lens array 12 serving as an optical lens. The casing 2 further includes a reflecting cover member 13. This reflecting cover member 13 has a bent portion 13a. The bent portion 13a has an end face contacting the first main surface of the second substrate 7. Specifically, the sensor IC's 10 and the drive IC's 11 are covered by the reflecting cover member 13 while being mounted on the first main surface of the second substrate 7 of the casing 2, with the heating elements 9 of the second substrate 7 being exposed to the outside.

The casing 2 can be made of resin by injection molding for example. The cover glass 5 can be made of glass or resin for example. The first substrate 6 can be a glass epoxy substrate for example. The second substrate 7 can be made of alumina ceramics for example. The LED chips 8 function as light sources for lighting a document D as an object to read. The heating elements 9 function as heat sources for recording on recording paper P. Specific arrangement for the heating elements 9 will be described later.

Each of the sensor IC's 10 includes image sensors each functioning as a light receiving element for receiving light reflected by the document D and outputting image signals, and a chip formed with a light receiving element controlling circuit for successively taking out the image signals from respective light receiving elements. The sensor IC's 10 are chip-bonded to the first main surface of the second substrate 7, and wirebonded to a wiring pattern (not illustrated) formed in the first main surface of the second substrate 7.

Each of the drive IC's 11 includes a chip formed with a heating element controlling circuit to selectively drive respective heating elements 9, and is chip-bonded to the first main surface of the second substrate 7. Further, each sensor IC 10 is wirebonded to a wiring pattern (not illustrated) formed in the first main surface of the second substrate 7.

The heat absorbing portion 14 is made of a metal such as aluminum for example, for absorbing heat generated by the heating elements 9 in the second substrate 7, preventing the second substrate 7 from overheating. The selfoc lens array 12 is made by inserting a special rod lens into a resin, for projecting an image from the document D on the light receiving elements without magnification nor inversion.

The reflecting cover member 13 is made of glass, resin or metal, for reflecting the reflected light from the document D after passing through the selfoc lens array 12, directing the light into the light receiving elements. Specifically, the reflecting cover member 13 has a surface, other than the bent portion 13a, opposed to the first main surface of the second substrate 7, and this opposed surface is formed at least partially of a reflecting surface. This reflecting surface can be formed by vaporizing or spattering a metal. According to the present embodiment, the reflecting surface of the reflecting cover member 13 is parallel to the first main surface of the second substrate 7 whereas the selfoc lens array 12 is inclined so as to have an optical axis inclined by a predetermined angle to the reflecting surface of the reflecting cover member 13. Further, the cover glass has an upper and lower surfaces each being vertical to the optical axis of the selfoc lens array 12.

If reading is to be made at a main scanning density of 8 pixels/mm for a document of size A4 for example, a total of 1728 light receiving elements must be disposed in a row at a constant interval. Such an arrangement can be achieved by disposing a plurality of sensor IC's 10 formed with a plurality of light receiving elements, in a row on the first main surface of the second substrate 7. For example, if the sensor IC 10 is formed with 96 light receiving elements, 18 of the sensor IC's 10 will be placed in longitudinal succession in close abutment on the adjacent sensor IC's so that all of the light receiving elements are disposed at a constant pitch.

The upper surface of the cover glass 5 is opposed by a reading platen roller 21. The document D is guided and fed onto the cover glass 5 by this platen roller 21.

With the above arrangement, the function of an image sensor for reading the image on the document D brought onto the cover glass 5 is achieved. Specifically, a monochrome image of the document D on a reading line L provided on the cover glass 5 is reflected, without magnification nor inversion, on the array of light receiving elements of the sensor IC's 10, and analog image signals representing amounts of light received by each of the light receiving elements are serially outputted for each reading line.

On the other hand, the row of the heating elements 9 disposed in the first main surface of the second substrate 2 is faced by a recording platen roller 22. This recording platen roller 22 feeds the recording paper P such as heat-sensitive paper while pressing the paper to the heating elements 9. With the above arrangement made on the first main surface of the second substrate 7, the function of a thermal head is achieved. Specifically, the drive IC's 11 selectively drive to heat the heating elements 9 out of the array of the heating elements 9 for each line according to recording-image data.

Next, a specific arrangement for the heating elements 9 will be described.

Figure 3:
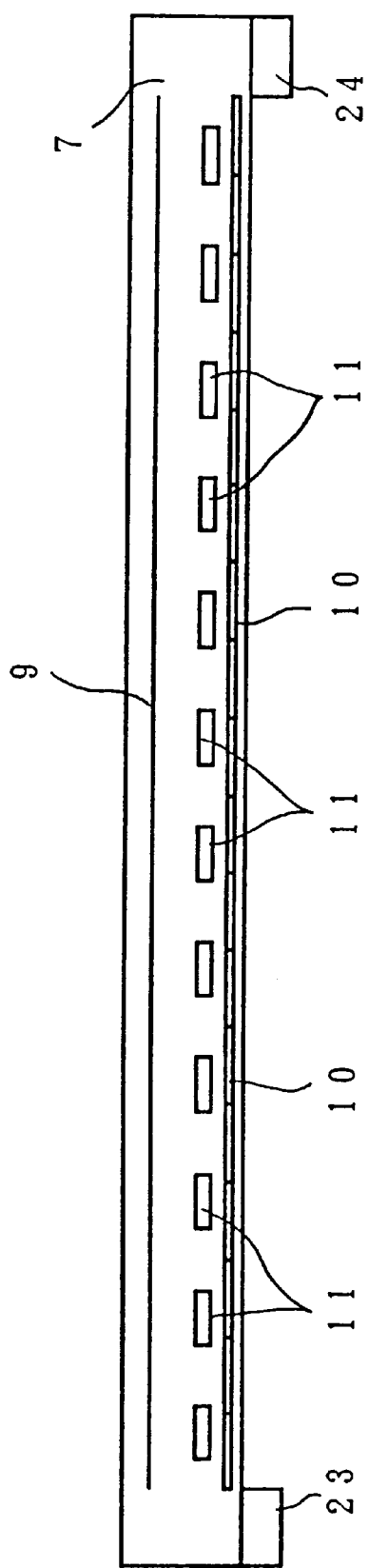
FIG. 3 is a plan view of a second substrate provided in the image reading/writing head shown in FIG. 1.

FIG. 3 is a plan view of the second substrate 7. The plurality of heating elements 9 are formed in a row closer to one longitudinal edge of the first main surface of the second substrate 7. On the other hand, a total of 18 sensor IC's and a total of 12 drive IC's 11 are disposed each in a row closer to the other longitudinal edge. The drive IC's 11 are closer to the heating elements 9 than are the sensor IC's. Each of the sensor IC's 10 is abutted by the adjacent sensor IC's. Further, the second substrate 7 has end portions attached with connectors 23 and 24 respectively. The connectors 23, 24 are connected by cables (not illustrated) for transmitting input/output signals and supplying power respectively to the sensor IC's 10 and drive IC's 11.

Figure 4:
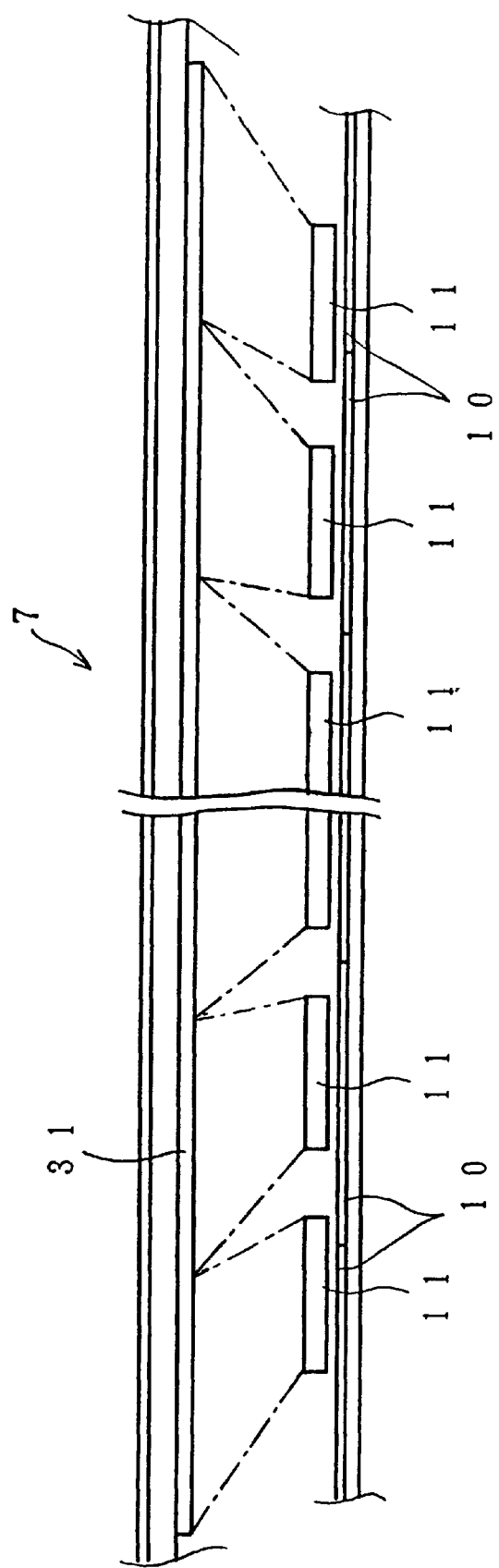
FIG. 4 is an enlarged plan view of a principal portion of longitudinal edge portions of the second substrate provided in the image reading/writing head shown in FIG. 1.

FIG. 4 is an enlarged plan view of a primary portion of the longitudinal edge portions of the second substrate 7. The heating elements 9 formed in the row closer to one longitudinal edge of the first main surface of the second substrate 7 are made of a straight line of heating resistor 31. A total of 1728 heating elements 9 are driven by a total of 12 drive IC's 11 each driving 144 heating elements. These drive IC's are mounted along the other longitudinal edge of the first main surface of the second substrate 7. The 18 sensor IC's 10 are also mounted on the first main surface of the second substrate 7 further closer to the above other longitudinal edge.

Figure 5:
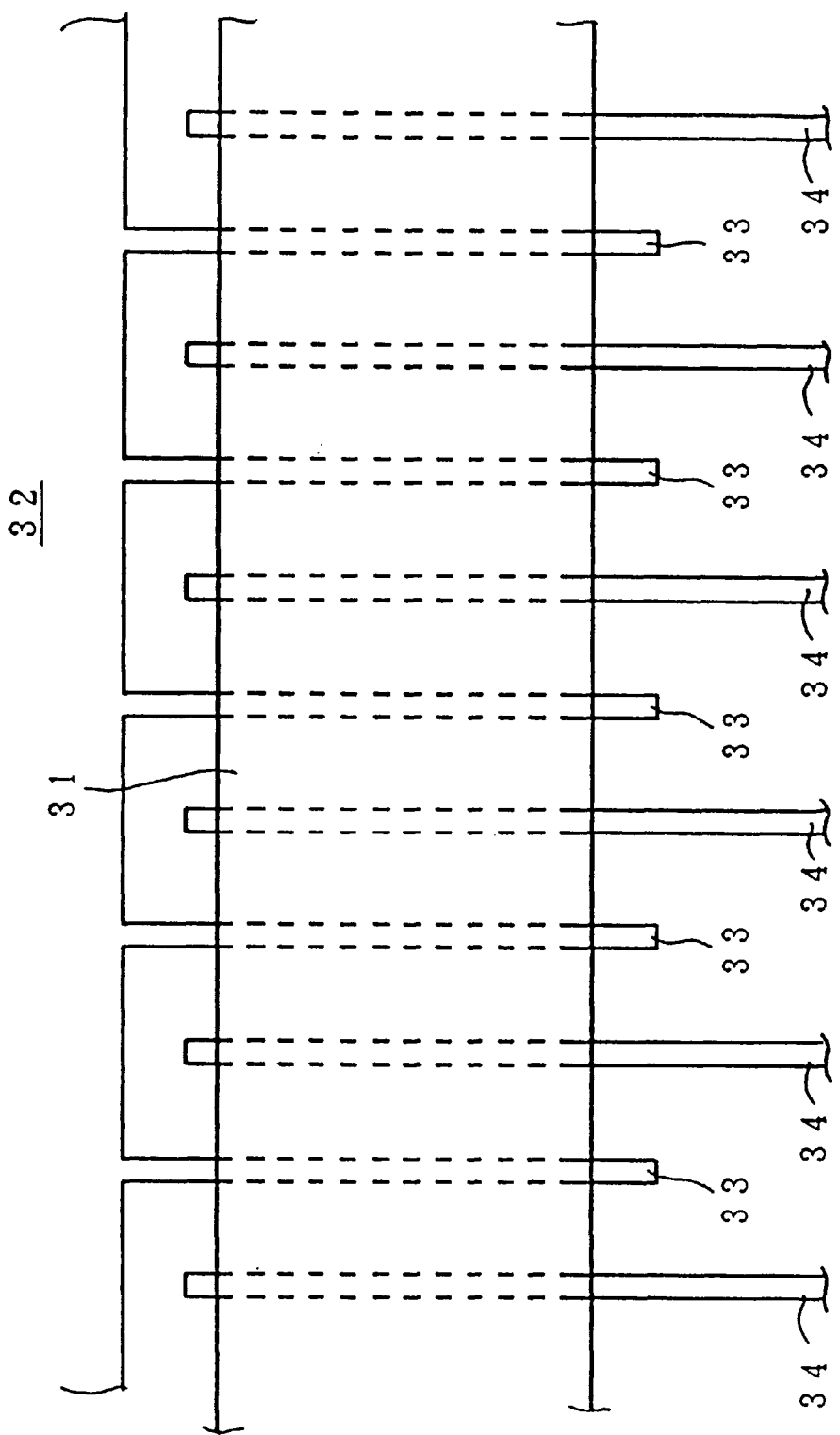
FIG. 5 is an enlarged plan view of a principal portion of heating elements in the second substrate provided in the image reading/writing head shown in FIG. 1.

FIG. 5 is an enlarged plan view of part of the heating resistor 31. The heating resistor 31 is abutted by a common electrode wiring 32 extending parallel to the heating resistor. From this common electrode wiring 32, a comb-teeth like common pattern 33 is extended widthwise of the second substrate 7 underneath the heating resistor 31. Each pair of the comb teeth is intercepted by an individual electrode 34 which is also formed in a comb-tooth pattern. Each of the individual electrode patterns 34 has a base end portion closer to one of the drive IC's so that each of the individual electrode patterns 34 is wirebonded to an output pad of that drive IC 11.

The drive IC's select an applied current to the individual electrode 34 according to the entered recording-image data. In the heating resistor 31, the current flows from the selected individual electrode 34 to a couple of common patterns 33 flanking this particular individual electrode 34, heating a portion between the two common patterns. Specifically, as shown in FIG. 5, the heating resistor 31 is crosscut by the comb-teeth like common pattern 33, divided into very fine portions each functioning as the heating element 9.

Next, arrangement for the sensor IC's 10 and drive IC's 11 will be described specifically.

Figure 6:
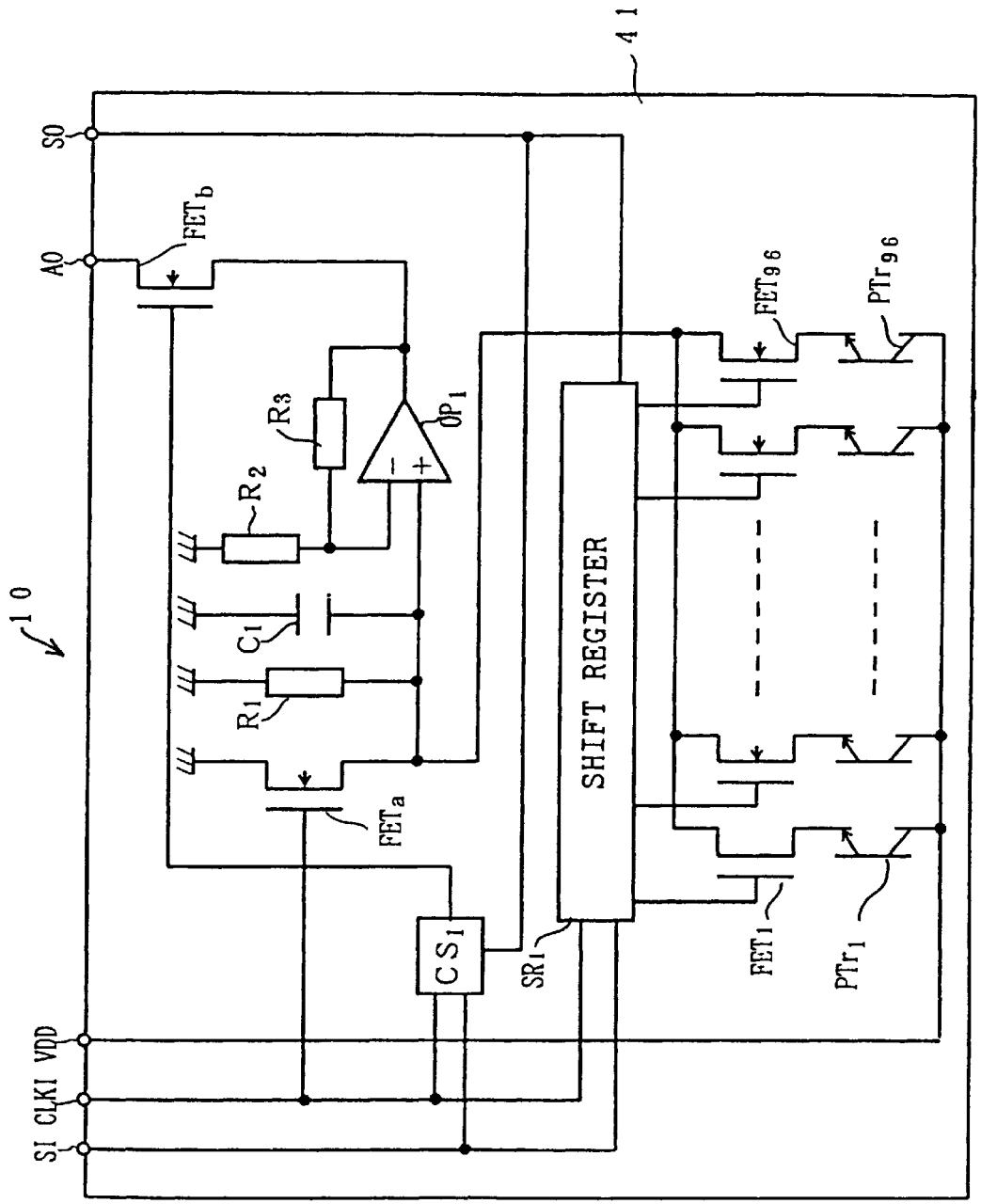
FIG. 6 is a circuit block diagram of a sensor IC (integrated circuit for reading) provided in the image reading/writing head shown in FIG. 1.

FIG. 6 is a circuit block diagram of the sensor IC 10. Each of the sensor IC's 10 is formed with 96 photo transistors $PTr_1 \sim PTr_{96}$, 96 field effect transistors $FET_1 \sim FET_{96}$, a shift resister $SR_1$ for receiving light, a chip selecting circuit $CS_1$, an operational amplifier $OP_1$, field effect transistors $FET_a$, $FET_b$, a capacitor $C_1$, resistors $R_1 \sim R_3$, and pads SI, CLKI, VDD, AO, and SO. Each of the photo transistors $PTr_1 \sim PTr_{96}$ constitutes a light receiving element for outputting analog image signals according to the image on the document D when reflected light from the document D is fed. The field effect transistors $FET_1 \sim FET_{96}$, the shift register $SR_1$, the chip selecting circuit $CS_1$, the operational amplifier $OP_1$, the field effect transistors $FET_a$, $FET_b$, and the capacitor $C_1$, resistors $R_1 \sim R_3$ constitute a light receiving element controlling circuit for successively taking out the outputs from the photo transistors $PTr_1 \sim PTr_{96}$.

Each of the photo transistors $PTr_1 \sim PTr_{96}$ has a collector connected to the pad VDD, whereas an emitter is connected to a drain of a corresponding one of the field effect transistors $FET_1 \sim FET_{96}$. Each of the field effect transistors $FET_1 \sim FET_{96}$ has a gate connected to an output terminal of the shift register $SR_1$ whereas a source is connected commonly to a drain of the field effect transistor $FET_a$ and a non-inverting output terminal of the operational amplifier $OP_1$. The field effect transistor $FET_a$ has a gate connected to a pad CLKI whereas its source is grounded. The operational amplifier $OP_1$ has an output terminal connected to a drain of the $FET_b$ and an end of the resistor $R_3$, whereas its inverting input terminal is connected to the other end of the resistor $R_3$ and an end of the resistor $R_2$. The non-inverting input terminal of the operational amplifier $OP_1$, a drain of the field effect transistor $FET_a$ and a source of each of the field effect transistors $FET_1 \sim FET_{96}$ is connected to an end of the resistor $R_1$ and an end of the capacitor $C_1$. The other ends of the resistors $R_1$, $R_2$ and the capacitor $C_1$ are grounded respectively. The field effect transistor $FET_b$ has its gate connected to the output terminal of the chip selecting circuit $CS_1$, whereas its source is connected to the pad AO.

Figure 7:
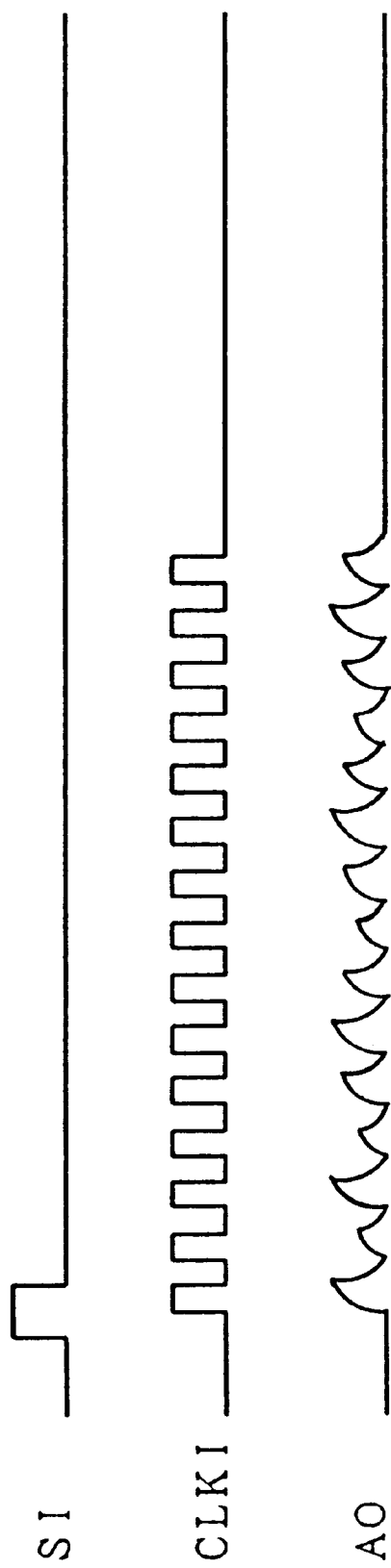
FIG. 7 is a graph showing signal waves at different places of the sensor IC shown in FIG. 6.

FIG. 7 is a graph showing signal wave patterns at different points of the sensor IC 10 with SI representing a serial in-signal entered to the pad SI, CLKI representing a clock signal entered to CLKI, and AO representing image signal outputted to AO.

The shift register $SR_1$ which receives serial-in signals via the pad SI successively outputs drive pluses to respective gates of the field effect transistors FET1~FET96 in synchronization with the clock signal entered via the pad CLKI. Specifically, the serial in-signal is first entered to the first bit of the shift resistor $SR_1$. This turns on the first bit of the shift resistor $SR_1$, applying drive voltage to the gate of the field effect transistor $FET_1$, turning on the field effect transistor $FET_1$ for supplying the non-inverting input terminal of the operational amplifier $OP_1$ with electric charge stored in the light receiving photo transistor PTr1. At every input of the clock signal, the serial in-signal is successively shifted to the next step in the shift resistor $SR_1$. As a result, electric charge, i.e. image signals, stored in the photo transistors $PTr_1 \sim PTr_{96}$ are successively supplied to the non-inverting input terminal of the operational amplifier $OP_1$. The image signals are then amplified by the operational amplifier $OP_1$, then outputted via the field effect transistor $FET_b$ which acts as an analog switch to the pad AO, and then supplied via the wiring pattern in the second substrate 7 to the outside of the image reading/writing head 1.

The serial in-signals thus transferred to the final bit of the shift resistor $SR_1$, are then outputted to the pad SO and chip selecting circuit $CS_1$ when the next clock signal is entered. The serial out-signals outputted to the pad SO are then supplied as serial in-signals via the wiring pattern in the second substrate 7 to the pad SI of the sensor IC 10 of the next step.

The chip selecting circuit $CS_1$ turns on or off the field effect transistor $FET_b$ in synchronization with the clock signal entered to the pad CLKI, from the time when the serial in-signals are entered to the pad SI to the time when the serial out-signals are outputted to the pad SO. Specifically, once the serial out-signal is entered, the chip selecting circuit $CS_1$ stops supplying the drive signals to the gate of the field effect transistor $FET_b$ for turning off the field effect transistor $FET_b$. This stops supply from the operational amplifier $OP_1$ to the pad AO, effectively preventing noise for example amplified by the operational amplifier $OP_1$ from being entered to the pad AO.

Further, the field effect transistor $FET_a$ which acts as an analog switch, turns on or off in synchronization with the clock signals entered to the pad CLKI for switching between two states of supplying the operational amplifier $0P_1$ with electric charge from the photo transistors $PTr_1 \sim PTr_{96}$ outputted via the field effect transistors $FET_1 \sim FET_{96}$, and of grounding. The capacitor $C_1$ and the resistor $R_1$ correct output wave forms from the photo transistors $PTr_1 \sim PTr_{96}$, whereas the resistors $R_2$, $R_3$ determine a level of voltage amplification in the operational amplifier $OP_1$.

Figure 8:
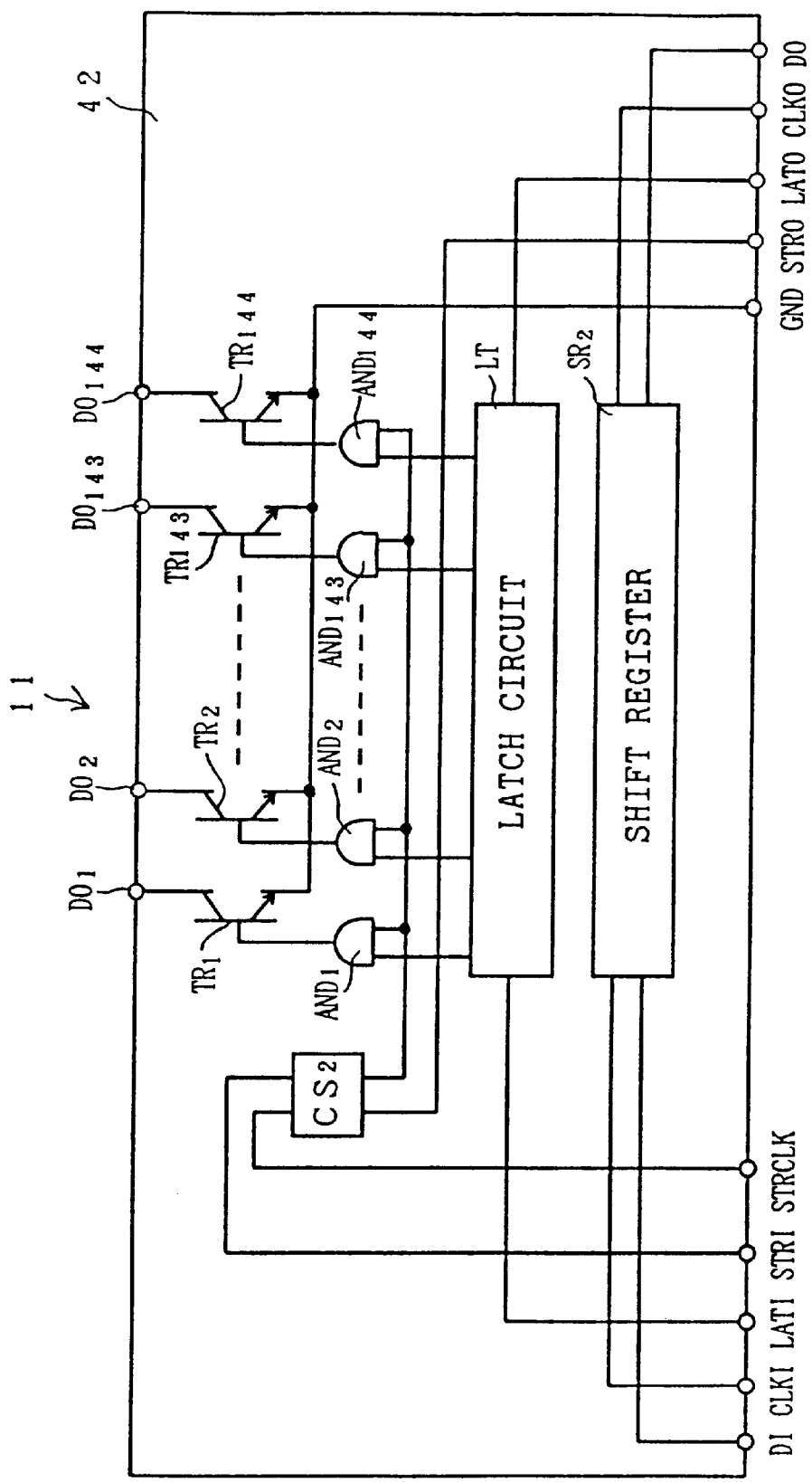
FIG. 8 is a circuit block diagram of a drive IC (integrated circuit for writing) provided in the image reading/writing head shown in FIG. 1.

FIG. 8 is a circuit block diagram of the drive IC 11. The drive IC 11 has a chip 42 formed with a chip selecting circuit $CS_2$, a latch circuit LT, a shift register $SR_2$, 144 AND circuits $AND_1 \sim AND_{144}$, 144 bipolar transistors $Tr_1 \sim Tr_{144}$, and pads DI, CLKI, LATI, STRI, STRCLK , GNK, STRO, LATO, CLKO. DO, . Each of the bipolar transistors $Tr_1 \sim Tr_{144}$ constitutes a switch to heating elements 9. The shift register $SR_2$, 144 AND circuits $AND_1 \sim AND_{144}$, and 144 bipolar transistors $Tr_1 \sim Tr_{144}$ constitute a heating element controlling circuit for selectively turning on the heating elements 9 according to the recording-image data.

Each of the AND circuits $AND_1 \sim AND_{144}$ has an output terminal connected to the base of respective bipolar transistors $Tr_1 \sim Tr_{144}$, a first input terminal connected to an output terminal of the latch circuit LT, and a second input terminal connected to one of the output terminals of the chip selecting circuit $CS_2$. The bipolar transistors $Tr_1 \sim Tr_{144}$ have respective emitters commonly connected to the pad GND, and collectors connected to pad $DO_1 \sim DO_{144}$ respectively.

Figure 9:
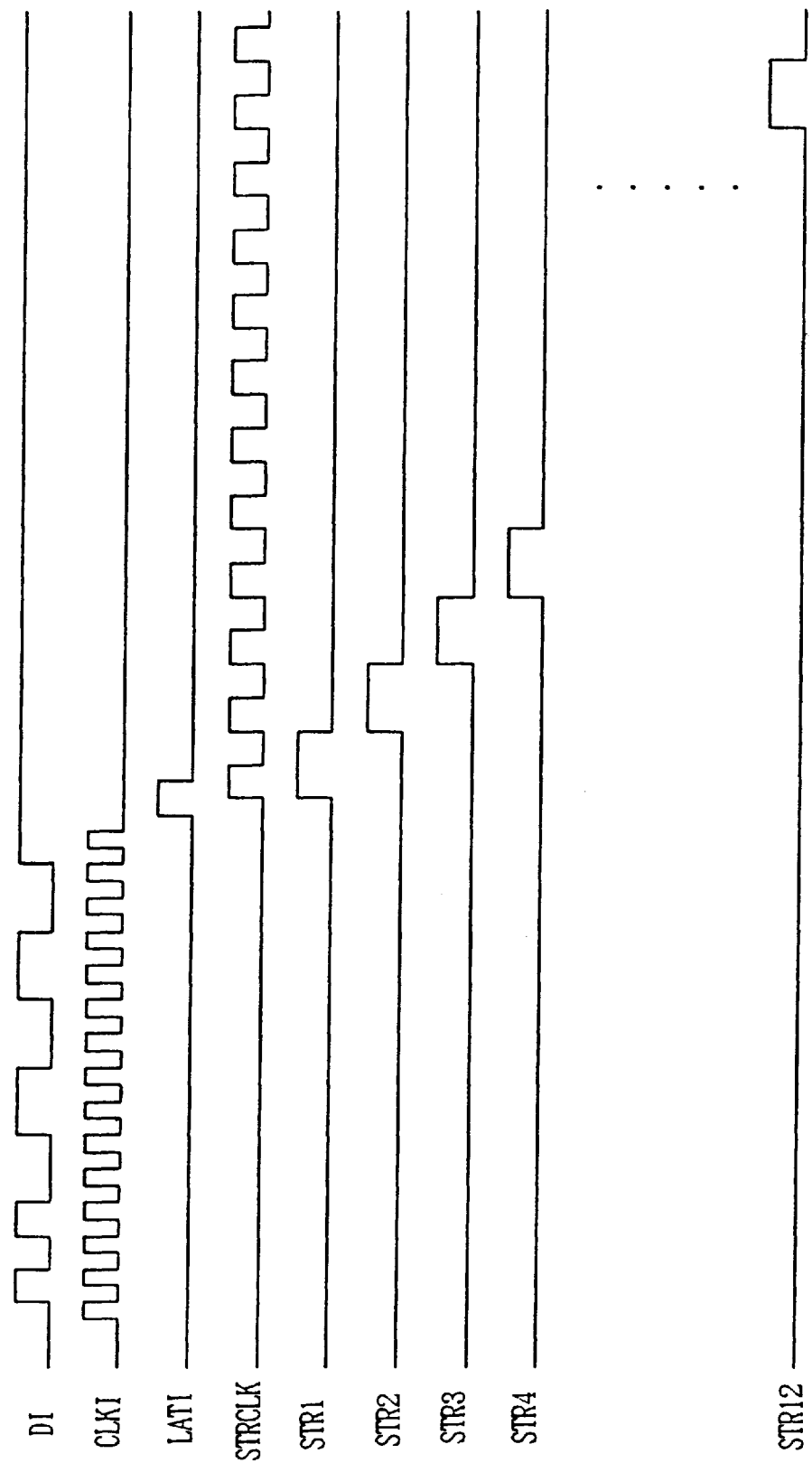
FIG. 9 is a graph showing signal waves at different places of the drive IC shown in FIG. 8.

FIG. 9 is a graph showing signal wave patterns at different points of the drive IC 11 with DI representing recording-image data entered to the pad ID, CLKI representing clock signals entered to the pad CLKI, ATI representing latch signals entered to the pad LATI, STRCLK representing strobing clock signals entered to the pad STRCLK, and $STR_1 \sim STR_{12}$ representing strobe signals generated by the chip selecting circuit $CS_2$.

The shift register $SR_2$ receives recording-image data serially entered to its first bit and successively forwards the signal to the next bit in synchronization with the clock signal entered via the pad CLKI, thereby tentatively storing a total of 144 bits of recording-image data. The recording-image data thus transferred to the final bit of the shift resistor $SR_2$, are then outputted to the pad DO when the next clock signal is entered, and then supplied via the wiring pattern in the second substrate 7 to the pad DI of the drive IC 11 of the next step. Meanwhile the clock signal entered via the pad CLKI to the shift register $SR_2$ is then outputted from the shift resistor $SR_2$ to the pad CLKO and then supplied via the wiring pattern on the second substrate 7 to the pad CLKI of the drive IC 11 of the next step. The clock signal supplied to this shift register $SR_2$ is the same clock signal as supplied to the shift register $SR_1$ of the sensor IC 10, being supplied from one connector pin of the connector 23 or 24 via the wiring pattern on the second substrate 7 to the CLKI of the first-step sensor IC 10 and the CLKI of the first-step drive IC 11. Specifically, one clock signal serves the clock signal for timing control in the sensor IC 10 and the clock signal for timing control in the drive IC 11.

The latch circuit LT captures the image signal stored at each bit of the shift register $SR_2$ upon reception of a latch signal via the pad LATI. The latch signal entered to the latch circuit LT is then outputted from the latch circuit LT to the pad LATO and is supplied to the pad LATI of drive IC 11 of the next step.

The chip selecting circuit $CS_2$ receives a strobe signal entered to a first input terminal via the pad STRI and another strobe signal entered to a second input terminal via the pad STRCLK for generating a new strobe signal, and outputs the new strobe signal from both of its output terminals. The new strobe signal outputted from one of the output terminals of the selecting circuit $CS_2$ is supplied to the other input terminal of each of the AND circuits $AND_1 \sim AND_{144}$. On the other hand, the new strobe signal outputted from the other output terminal is supplied to the pad STRO. The strobe signal supplied to the pad STRO is supplied to the pad STRI of image reading/writing head IC 10 of the next step. Specifically, the chip selecting circuit $CS_2$ has a D flip-flop circuit for outputting, in synchronization with a rise of the strobe clock signal entered to the second input terminal via the pad STRCLK, a high-level signal or a low-level signal depending on whether the strobe signal entered to the first input terminal via the pad STRI is high level or low level. Then, when a latch signal for example is entered as a strobe signal to the chip selecting circuit $CS_2$ of the first-step drive IC 11 of the 12 drive IC's mounted on the second substrate 7, the output level of the chip selecting circuit $CS_2$ becomes high in synchronization with the rise of the first strobe clock signal that follows. Then at the rise of the next strobe clock signal, the latch signal is already dropped to the low level, and thus the output level from the chip selecting circuit $CS_2$ changes from the high level to the low level. As a result, the chip selecting circuit $CS_2$ outputs a strobe signal which becomes high level only for a period corresponding to one cycle of the strobe clock signal. This strobe signal is entered as the strobe signal to the chip selecting circuit $CS_2$ of the next-step drive IC 11, the chip selecting circuit $CS_2$ of the next-step drive IC 11 outputs a strobe signal which rises at the same time as the strobe signal generated by the chip selecting circuit $CS_2$ of the previous-step drive IC 11 and becomes high level only for the period corresponding to the cycle of the strobe clock signal. In such a way, the chip selecting circuits $CS_2$ of each of the 12 drive IC's successively generate a new strobe signal for avoiding timing overlap.

When a new strobe signal is outputted from the first output terminal of the chip selecting circuit $CS_2$, the second input terminal of each of the AND circuits $AND_1 \sim AND_{144}$ becomes high level. At this point, the signal at the output terminal of each of the AND circuits $AND_1 \sim AND_{144}$ is equal to the output from the latch circuit LT supplied to the first input terminal of the AND circuits $AND_1 \sim AND_{144}$. Specifically, the level of the output terminal of the AND circuits $AND_1 \sim AND_{144}$ is determined according to the information at each bit of the image data stored in the latch circuit LT, which then determines the ON-OFF state of the bipolar transistors $Tr_1 \sim Tr_{144}$. The pads $DO_1 \sim DO_{144}$ are connected to individual electrode patterns 34 respectively. Thus, if any one of the bipolar transistors $Tr_1 \sim Tr_{144}$ is turned on, a closed loop is established beginning from a positive terminal of the power supply, through the common electrode wiring 32, common pattern 33, heating resistor 31, individual electrode pattern 34, the turned bipolar transistor $Tr_1 \sim Tr_{144}$, and the pad GND, to the negative terminal of the power supply, supplying electric current to the relevant portion of the heating resistor 31 of the heating elements 9 for recording the image on the recording paper P.

With the above arrangement, when the document D is read, light emitted from the LED chips 8 is cast via the cover glass 5 to the document D. The light is reflected by the document D, and passes the cover glass 5 to the selfoc lens array 12. The reflected light is focused by the selfoc lens array 12, then re-directed by the reflecting surface of the reflecting cover member 13 for entering the light receiving elements formed in the sensor IC's. The sensor IC's 10 generates image signals which are then taken out of the image reading/writing head 1 via the wirebonding, the wiring pattern formed in the first main surface of the second substrate 7, the connector 23 or 24, and an unillustrated cable, completing the reading of one line of the image. Then the platen roller 21 feeds the document D in a direction of the arrow in FIG. 2 by an amount of the line for repeating the above described cycle of reading.

When an image is recorded on the recording paper P, recording-image data is entered to the drive IC's 11 from outside of the image reading/writing head 1 via an unillustrated cable, the connector 23 or 24, the wiring pattern formed in the first main surface of the second substrate 7 and the wirebonding. Then, the drive IC's 11 select the heating elements 9 according to the recording-image data and supply the individual electrode patterns 34 with electric current according to the selection, i.e. establishes relevant closed loops starting from the positive terminal of the power supply through the selected individual electrode patterns 34, the heating resistor 31, the common patterns 33 and the common electrode wiring 32, to the negative terminal of the power supply, making the selected heating elements 9 be heated for recording a line of the image on the recording paper P. Then, the platen roller 22 feeds the recording paper P in a direction of the arrow in FIG. 2 by an amount of the line for repeating the above described cycle of recording.

When copying, the above reading cycles and the writing cycles are performed simultaneously. Specifically, the read image signals outputted from the sensor IC's 10 are converted into binary signals by a circuit provided outside the image reading/writing head, and then entered to the drive IC's as the recording-image data. During this operation, in the 18 sensor IC's 10, the image signals for a line are outputted successively from the first bit (the bit corresponding to the photo transistor $PTr_1$ in FIG. 6) of the shift register $SR_1$ of the first-state sensor IC 10 (the left-end sensor IC 10 in FIG. 3), so the image signal from the last bit (the bit corresponding to the photo transistor $PTr_{96}$ in FIG. 6) of the shift register $SR_1$ of the final-stage sensor IC 10 (the right-end sensor IC 10 in FIG. 3) is the last image signal for the line. These image signals are converted into binary data, and then entered serially to the first bit (the bit corresponding to the AND circuit $AND_1$ in FIG. 8) of the shift register $SR_2$ of the first-stage drive IC 11 (the left-end drive IC 11 in FIG. 3), so the image signal is successively forwarded toward the last bit (the bit corresponding to the AND circuit $AND_{144}$ in FIG. 8) of the shift register $SR_2$ of the final-stage drive IC 11 (the right-end drive IC 11 in FIG. 3). Specifically, the read image signals are forwarded in the direction shown by an arrow A in FIG. 10, whereas the recording-image signals are forwarded in the direction shown by an arrow B, both directions being the same direction. Thus, the read image signal from the first bit of the first-stage sensor IC 10 is held as the recording-image signal at the last bit of the final-stage drive IC 11.

Figure 10:
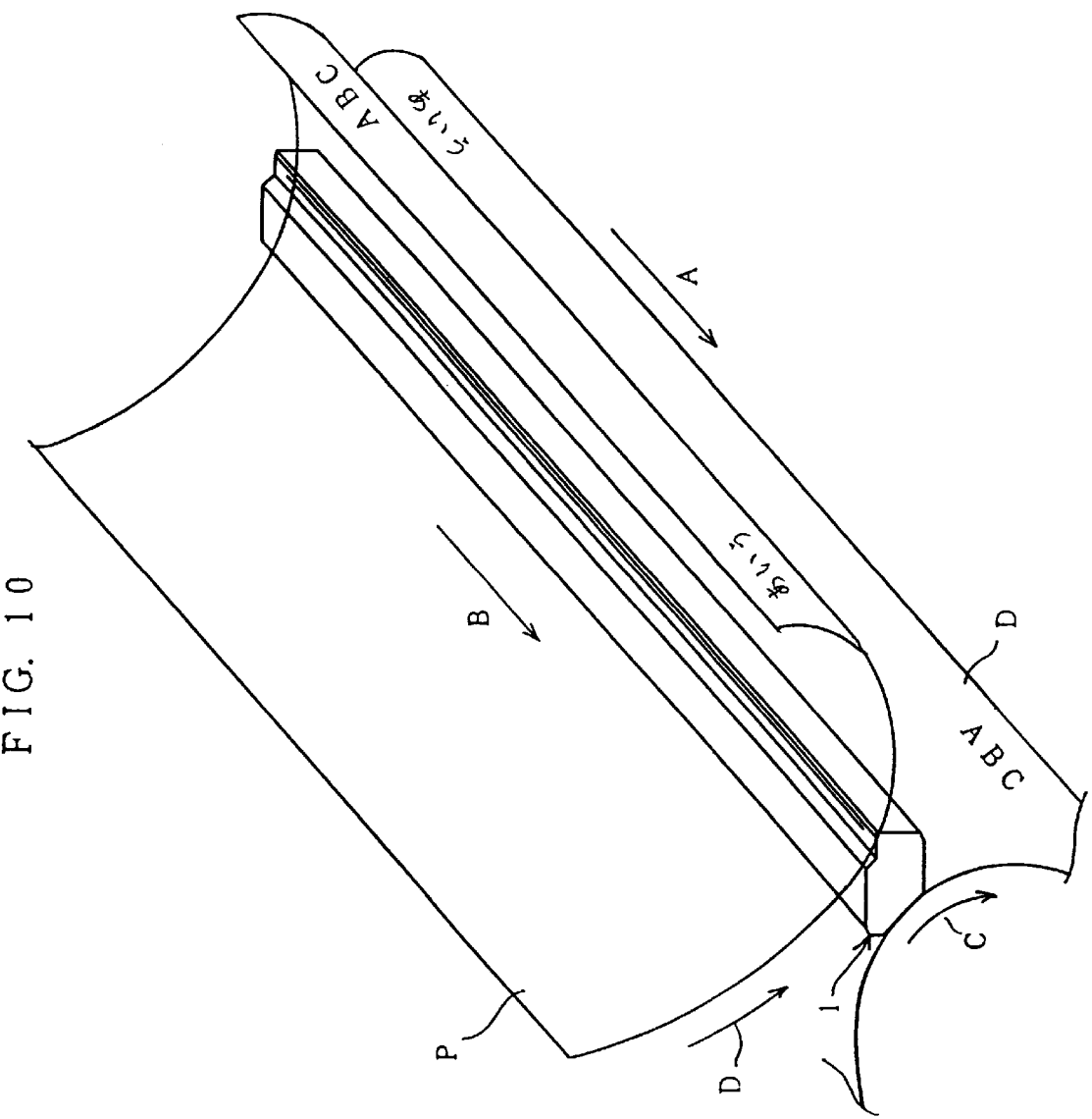
FIG. 10 is an illustration showing a relationship between a read image and a recorded image when a document is being copied.

Now, referring again to FIG. 10 which illustrates relationships between the read image and the recorded image, the document D is fed in a direction shown by an arrow C, whereas the recording paper P is fed in a direction shown by an arrow D, both directions being the same. Further, the reading surface for the document D and the recording surface for the recording paper P are opposed to each other with the image reading/writing head 1 in between. Thus, a left end of the reading surface for the document D corresponds to the first bit of the first-step sensor IC 10, whereas a left end of the recording surface of the recording paper corresponds to the last bit of the final-stage drive IC 11. As a result, as shown in FIG. 10, the letters in the reading surface of the document D are properly recorded on the recording paper P without mirror inversion.

Figure 11:
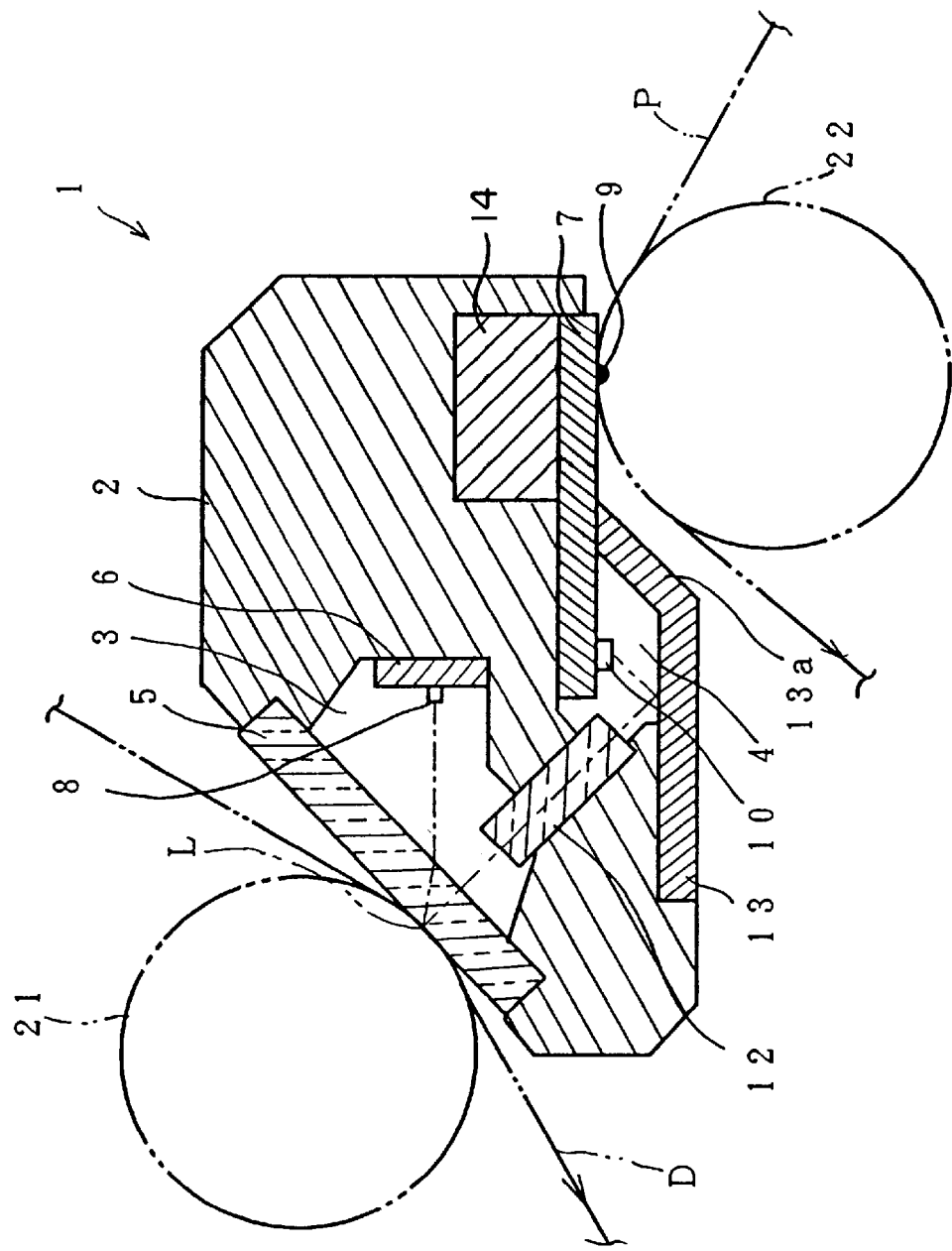
FIG. 11 is a sectional view of an image reading/writing head as a second embodiment of the present invention, taken in a line vertical to a longitudinal axis of the image reading/writing head.
Figure 12:
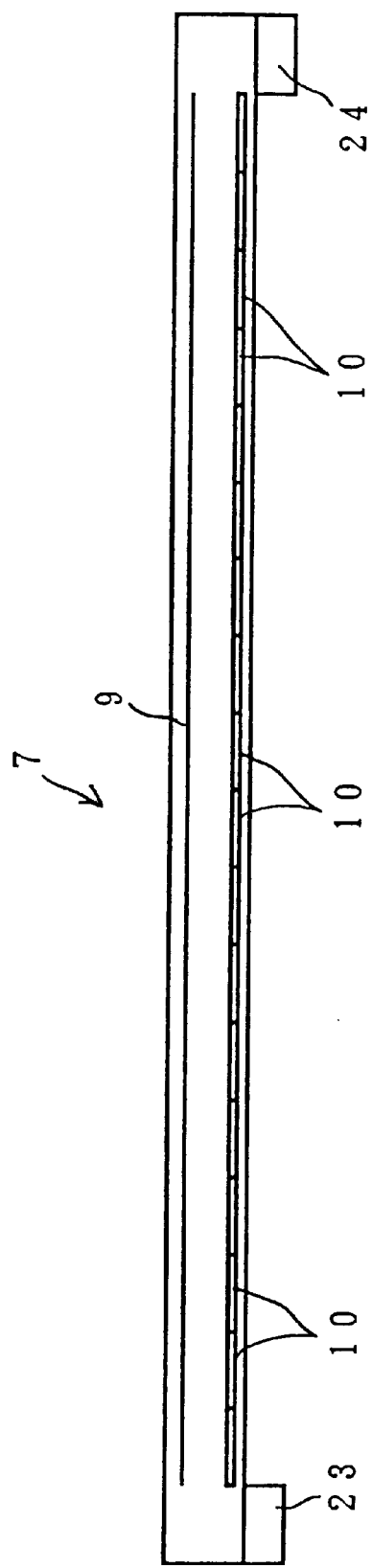
FIG. 12 is a plan view of a second substrate provided in the image reading/writing head shown in FIG. 11.
Figure 13:
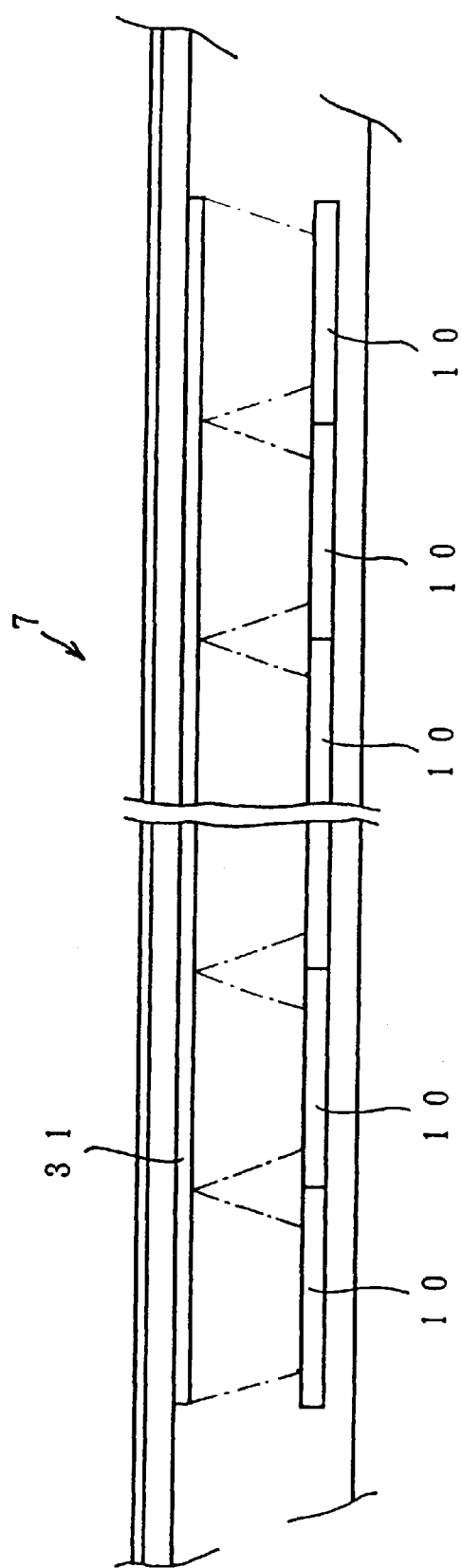
FIG. 13 is an enlarged plan view of a principal portion of longitudinal edge portions of the second substrate provided in the image reading/writing head shown in FIG. 11.

FIGS. 11 through show a second embodiment of the image reading/writing head according to the present invention. This second invention differs from the first embodiment shown in FIGS. 1 through 10 as follows. Specifically, the integrated circuit for reading 10 and the integrated circuit for writing 11 are bonded separately from each other in the first embodiment. According to the present embodiment, the circuits are integrated into a single chip so both functions of the integrated circuit for reading 10 and the integrated circuit for writing 11 are achieved by the single chip. In FIG. 11, all the other aspects excluding the above arrangement for this integrated circuit for image reading/writing head 10 are exactly the same as those shown in FIG. 2, and thus corresponding components and members are respectively given the same alpha-numeric codes without any detailed description. It should be noted however, that since this integrated circuit for image reading/writing head 10 includes a row of light receiving elements, the integrated circuit 10 are mounted to the first main surface of the second substrate 7 so that a pair of adjacent integrated circuits 10 abut on each other as shown in FIGS. 12 and 13.

Figure 14:
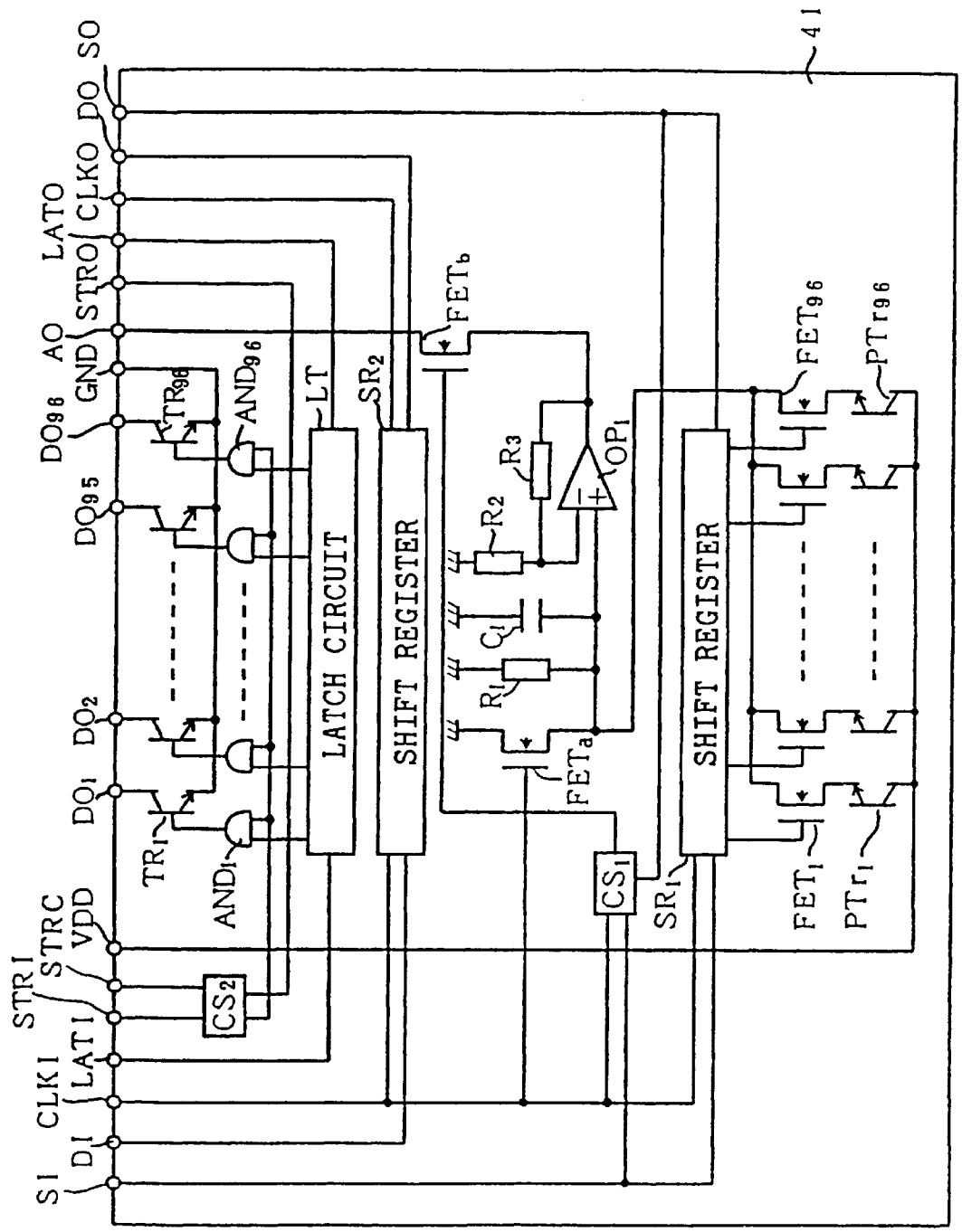
FIG. 14 is a circuit block diagram of an integrated circuit provided in the image reading/writing head shown in FIG. 11.

FIG. 14 is a circuit block diagram of the integrated circuit for image reading/writing head 10 used for the second embodiment. As will be clearly understood from a comparison between this FIG. 14 and FIGS. 6, 8 showing the first embodiment, the integrated circuit for image reading/writing head 10 for the second embodiment of the image reading/writing head integrates the arrangement made in the integrated circuit for reading 10 in FIG. 6 and the arrangement made in the integrated circuit for writing 11 in FIG. 8. It should be noted however, that according to the integrated circuit for image reading/writing head 10, the number of the photo transistors $PTr_1$~$PTr_{96}$ as light receiving elements is the same as the number of the bipolar transistors $Tr_1$~$Tr_{96}$, so that one integrated circuit for image reading/writing head 10 takes care of a same number of the light receiving elements and the heating elements 9. Specifically, the chip 41 of this particular integrated circuit for image reading/writing head 10 is formed with 96 photo transistors $PTr_1$~$PTr_{96}$, 96 field effect transistors $FET_1$~$FET_{96}$, a shift register $SR_1$ for receiving light, chip selecting circuits $CS_1$, $CS_2$, an operational amplifier $OP_1$, field effect transistors $FET_a$, $FET_b$, a capacitor $C_1$, resistors $R_1$~$R_3$, a shift register $SR_2$ for heating, a latch circuit LT, 96 AND circuits $AND_1$~$AND_{144}$ for example, 96 bipolar transistors $Tr_1$~$Tr_{96}$, and pads SI, TI, CLKI, LATI, STRI, STRC, VDD, $DO_1$~$DO_{96}$, GND, AO, STRO, LATO, CLKO, DO, and SO. Each of the photo transistors $PTr_1$~$PTr_{96}$ functions as a light receiving element for outputting analog image signals according to the image on the document D when reflected light from the document D is fed. The bipolar transistors $TR_1$~$TR_{96}$ constitute switches to heating elements 9. The field effect transistors $FET_1$~$FET_{96}$, the shift register $SR_1$, the chip selecting circuit $CS_1$, the operational amplifier $OP_1$, the field effect transistors $FET_a$, $FET_b$, the capacitor $C_1$, and resistors $R_1$~$R_3$ constitute a light receiving element controlling circuit for successively taking out the outputs from the photo transistors $PTr_1$~$PTr_{96}$. The shift register $SR_2$, the latch circuit LT, the chip selecting circuit $CS_2$, AND circuits $AND_1$~$AND_{96}$, and the bipolar transistors $Tr_1$~$Tr_{96}$ constitute a heating element controlling circuit for selectively turning on the heating elements 9 according to the recording-image data.

Figure 15:
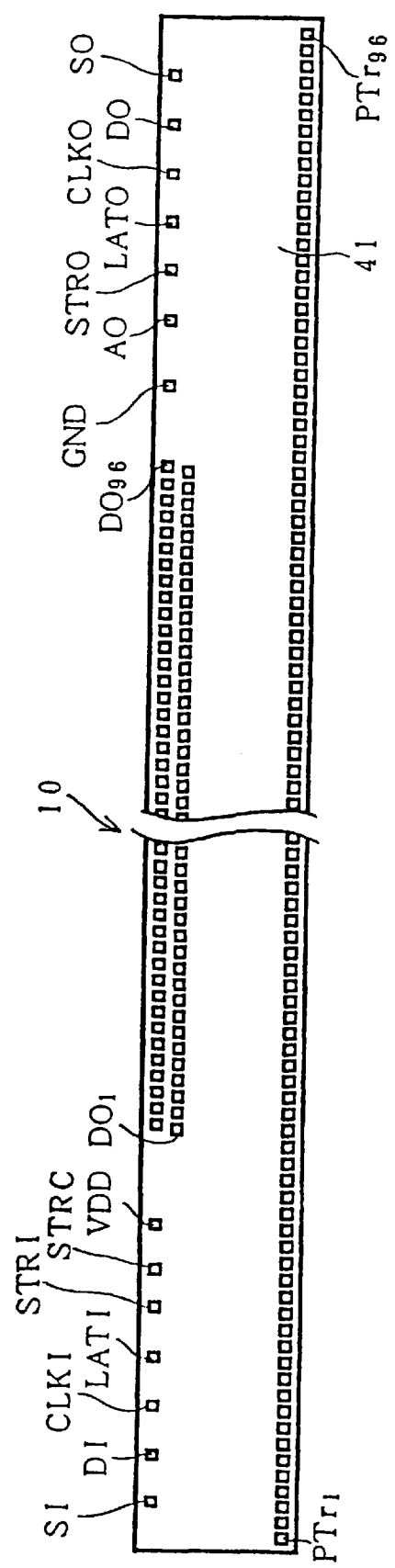
FIG. 15 is a simplified plan view of the integrated circuit provided in the image reading/writing head shown in FIG. 11.

As will be understood from FIGS. 14 and 15, the chip 41 of this integrated circuit for image reading/writing head 10 has a surface mounted with the photo transistors $PTr_1$~$PTr_{96}$ as the light receiving elements in a row closer to a longitudinal edge, and formed with all the pads SI, TI, CLKI, LATI, STRI, STRC, VDD, $DO_1$~$DO_{96}$, GND, AO, STRO, LATO, CLKO, DO and SO closer to the other longitudinal edge. Therefore, if the pads SI, TI, CLKI, LATI, STRI, STRC, VDD, $DO_1$~$DO_{96}$, GND, AO, STRO, LATO, CLKO, DO and SO are wirebonded to the wiring pattern of the second substrate 7, all the wires can be drawn toward the side away from the photo transistors, positively preventing the wires from shading light to the photo transistors $PTr_1$~$PTr_{96}$.

The reading controlling circuit and the writing controlling circuit included in the above integrated circuit for image reading/writing head 10 function exactly as has been described with reference to FIGS. 6 and 9, and therefore will not be described here.

Figure 16:
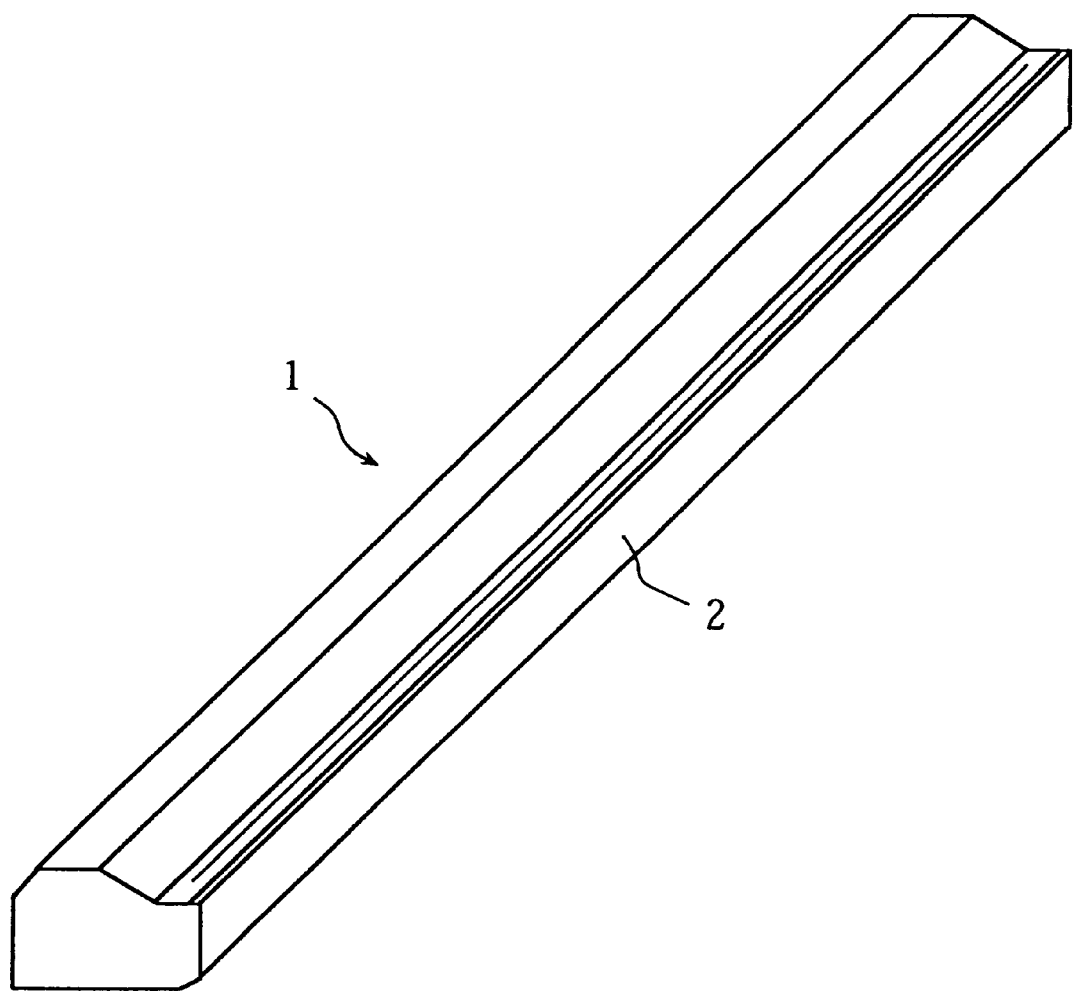
FIG. 16 is a perspective outline view of an image reading/writing head as a third embodiment of the present invention.
Figure 17:
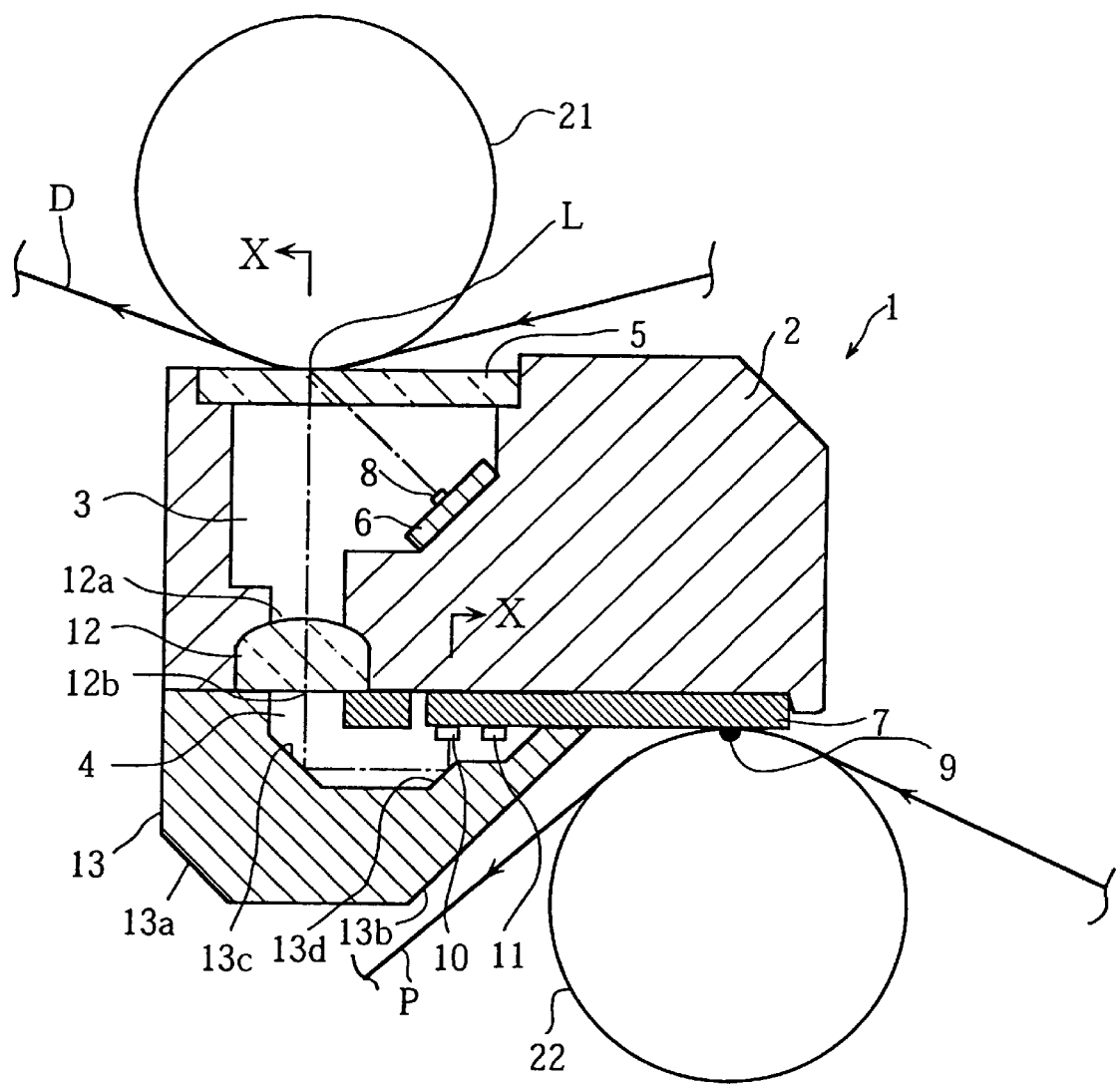
FIG. 17 is a sectional view of the image reading/writing head shown in FIG. 16 taken in a line vertical to a longitudinal axis of the image reading/writing head.
Figure 18:
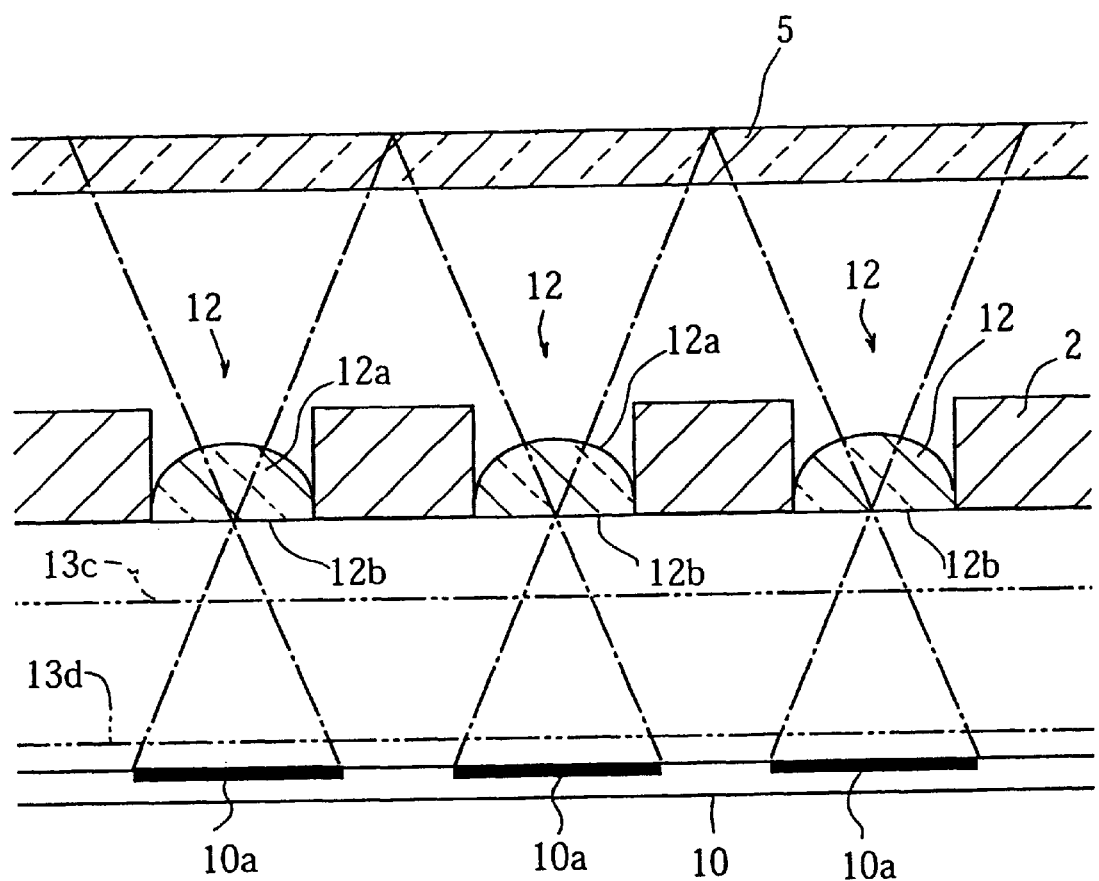
FIG. 18 is a sectional view taken in lines X—X in FIG. 17.

FIGS. 16 through 18 show a third embodiment of the image reading/writing head according to the present invention. FIG. 16 is an outline perspective of the image reading/writing head 1 according to this embodiment whereas FIG. 17 is a sectional view taken along a line transverse to a longitudinal axis of the image reading/writing head 1. A difference from the first embodiment which is typically shown in FIG. 2 is that a plurality of aspherical lenses are used as optical lenses 12 disposed in correspondence to respective integrated circuits for reading 10. Another difference is and that the reflecting cover member 13 is formed with two bent portions 13a, 13b, and the reflecting cover member has inner faces formed with a first reflecting surface 13c and a second reflecting surface 13d for reflecting the light twice after passing the aspherical lenses 12 for directing the light generally vertically to the light receiving elements in the integrated circuit for reading 10.

Again according to this embodiment, the heating elements 9, the integrated circuit for reading 10 and the integrated circuit for writing 11 are mounted in the first main surface of the second substrate 7. These heating elements 9, the reading IC 10 and the writing IC 11 may be those having the same arrangements and functions as those used in the previous embodiments shown in FIGS. 5, 6 and 8. It should be noted however, that as will be described with reference to FIG. 18, according to the present embodiment, the aspherical lenses 12 used as the optical lenses can form reduced images of respective predetermined ranges on the reading line L, on the light receiving elements of the reading IC's 10. Thus, the reading IC 10 can be made to have a shorter length according to the present embodiment, and further the reading IC 10 can be disposed apart from adjacent reading IC's as shown in FIG. 18.

The arrangement in FIG. 17 excluding those for the optical lenses 12 and the reflecting cover member 13 are basically the same as the first embodiment typically shown in FIG. 2, and therefore will not be described here.

FIG. 18 is a view of a section taken along lines X—X in FIG. 17, showing the convex lenses 12 and related components. As will be understood from this FIG. 18 and FIG. 17, for each of the convex lenses 12, the following components are successively disposed in an optical path of the light reflected by the document D: Specifically, the glass cover 5, the convex lens 12, the first reflecting surface 13c, the second reflecting surface 13d, and an array of light receiving elements of the reading IC 10 are disposed in this order. The convex lens 12 is an optical image forming medium having an aspherical incidence surface 12a and a flat outgoing surface 12b, and is placed, with the incidence surface 12a opposed to the cover glass 5 and the outgoing surface 12b inclined to the first reflecting surface 13c at about 45 degrees. When the reflected light passes from the incidence surface 12a to the outgoing surface 12b, the reflected light is concentrated according to an index of refraction and radius of curvature of the convex lens 12 while keeping the same quantity of light as of the time of incidence. Then, after reflecting on the first and second reflecting surfaces 13c, 13d, the reflected light enters the light receiving element. Specifically, each of the convex lenses 12 brings a predetermined continuous portion of the image contained in the document D to the corresponding light receiving element, by forming an inverted image of the above, on the light receiving element. Thus, an operation for inverting the direction of data transmission from each of the reading IC's must be performed.

Further, the convex lens 12 has a depth of focus adjusted so that the image is focused on the light receiving element 10a. Specifically, it is possible to control the length of the light path from the convex lens 12 to the light receiving elements 10a to be within a given range allowing for a certain deviation so that the image should be focused on the surface of the light receiving element 10a. Further, each of the convex lenses 12 can form the image on the light receiving element at a predetermined rate of magnification. With such an arrangement, it becomes possible to reduce the length of the array of light receiving elements to be formed in each of the reading IC's 10, thereby decreasing the size of the reading IC 10.

Further, according to the present embodiment, the optical lens is an aspherical lens 12 having a deeper depth of focus than does the selfoc lens. Thus, the length of the light path from the document D to the light receiving element may not be as precise as otherwise. This makes it possible to reduce manufacturing cost of the overall head, as well as to enjoy an advantage that reading can be appropriate even if the document is held slightly above the reading surface. Further, according to the present embodiment, the reflected light after passing the convex lens 12 is reflected twice so as to enter the light receiving element 10a generally vertically. This makes it possible to further increase the image reading efficiency by the light receiving element.

It should be noted here that according to the present embodiment, the reading IC and the writing IC are provided in the first main surface of the second substrate 7 independently from the other. However, the integrated circuit which includes both of the reading and writing circuits as described earlier with reference to FIGS. 14, may of course be used.

FIGS. 19 through 22 are sectional views of a primary portion of a fourth, fifth and sixth embodiments of the image reading/writing head according to the present invention. Again, for these figures, description will be made only for differences from the previous embodiments. All the common aspects will not be described, with components and members given the same alpha-numeric codes as in the previous figures.

Figure 19:
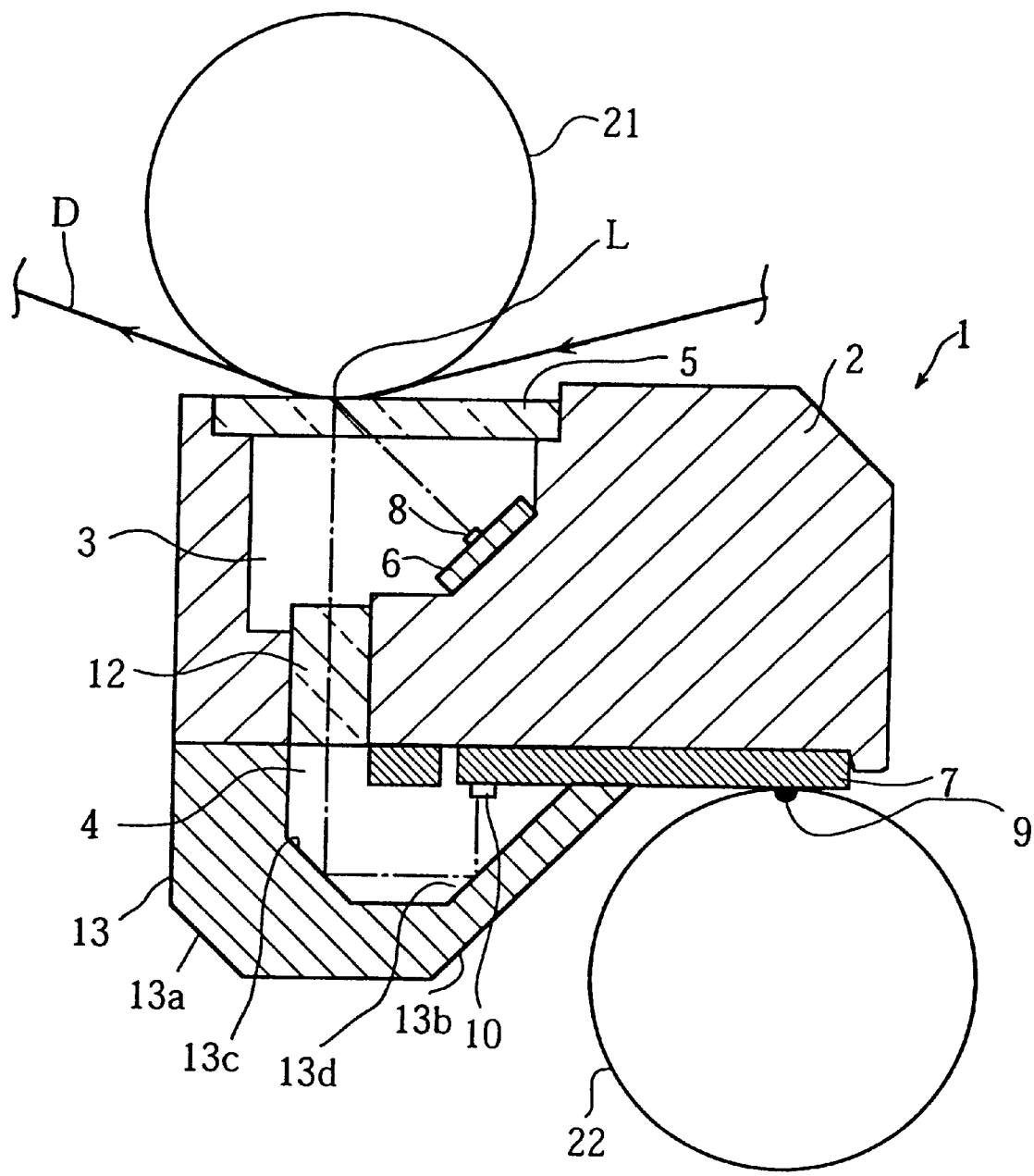
FIG. 19 is a sectional view of a principal portion of the image reading/writing head as a fourth embodiment of the present invention.

The fourth embodiment shown in FIG. 19 is a variation to the third embodiment typically shown in FIG. 17. The aspherical lens used as the optical lens in the third embodiment is replaced by the selfoc lens array 12 here. Another difference is that the first main surface of the second substrate 7 is mounted with the integrated circuit 10 which includes both of the reading and writing controlling circuits. However, again in this embodiment, the reflected light after passing the selfoc lens array 12 is reflected twice, i.e. first by the first reflecting surface 13c and then by the second reflecting surface 13d each formed in the inner surface of the reflecting cover member 13, before the reflected light enters the light receiving element generally vertically. This makes it possible to further increase the image reading efficiency by the light receiving element.

Figure 20:
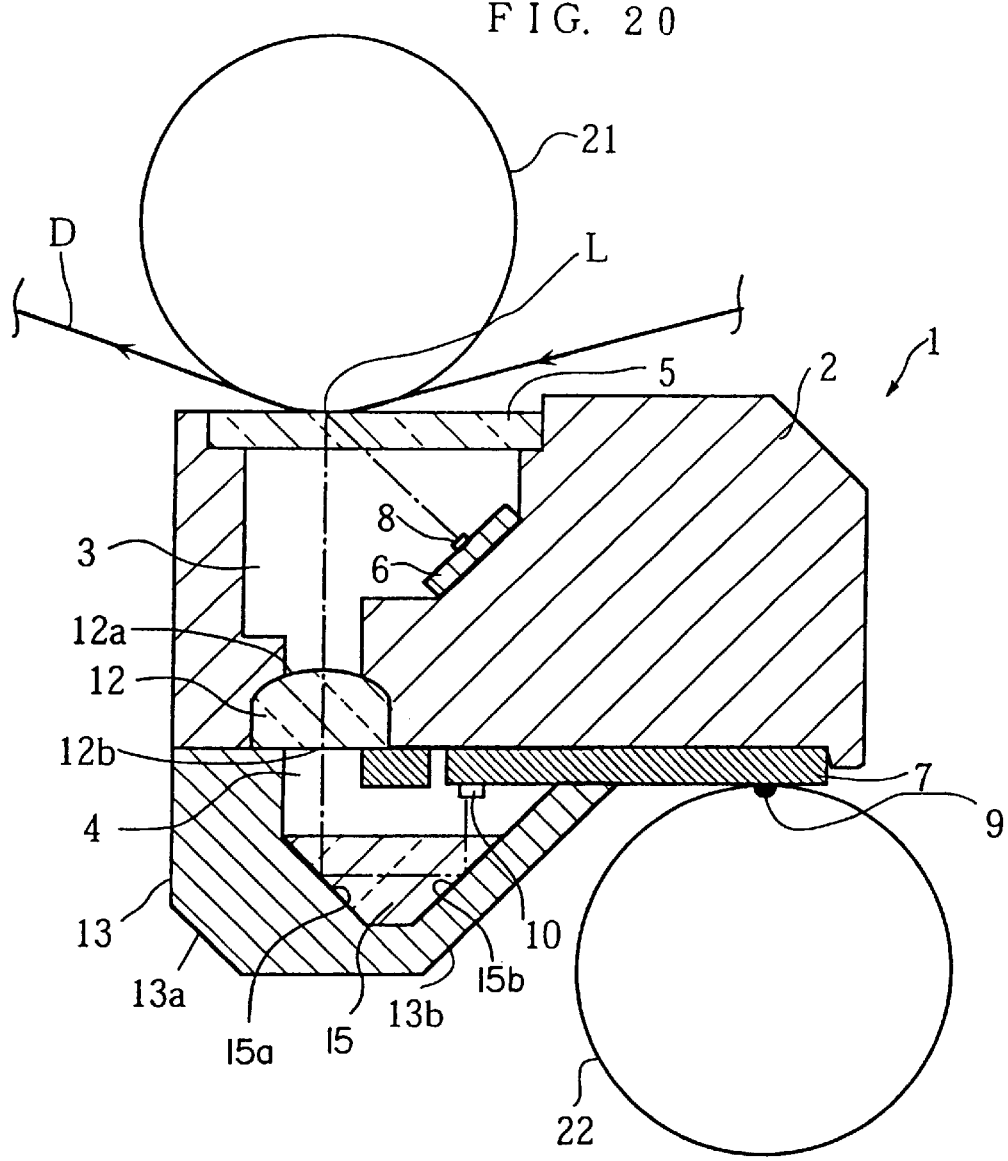
FIG. 20 is a sectional view of a principal portion of the image reading/writing head as a fifth embodiment of the present invention.
Figure 21:
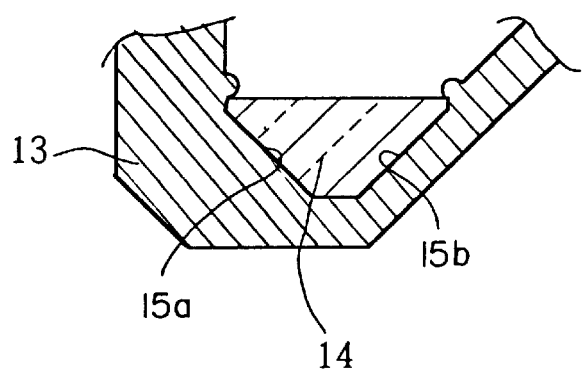
FIG. 21 is an illustration showing a supporting mechanism for a prism of the image reading/writing head shown in FIG. 20.

The fifth embodiment shown in FIG. 20 is also a variation to the third embodiment typically shown in FIG. 17. Here, mirror surfaces as the means for reflecting the light twice after passing the optical lens are replaced by a prism 15 which provides first and second reflecting surfaces 15a, 15b. The prism 15 can be made by molding a transparent resin for example. By using the prism 15, each of the reflecting surfaces 15a, 15b can be a total reflecting surface for increased efficiency of reflection, whereas the physical distance from the lens 12 to the light receiving element can be increased for greater freedom for the location of the integrated circuit 10 formed with the light receiving elements. It should be noted here that the prism 15 can be press-fit to the reflecting cover member 13 as shown in FIG. 21 for easier assembling operation.

Figure 22:
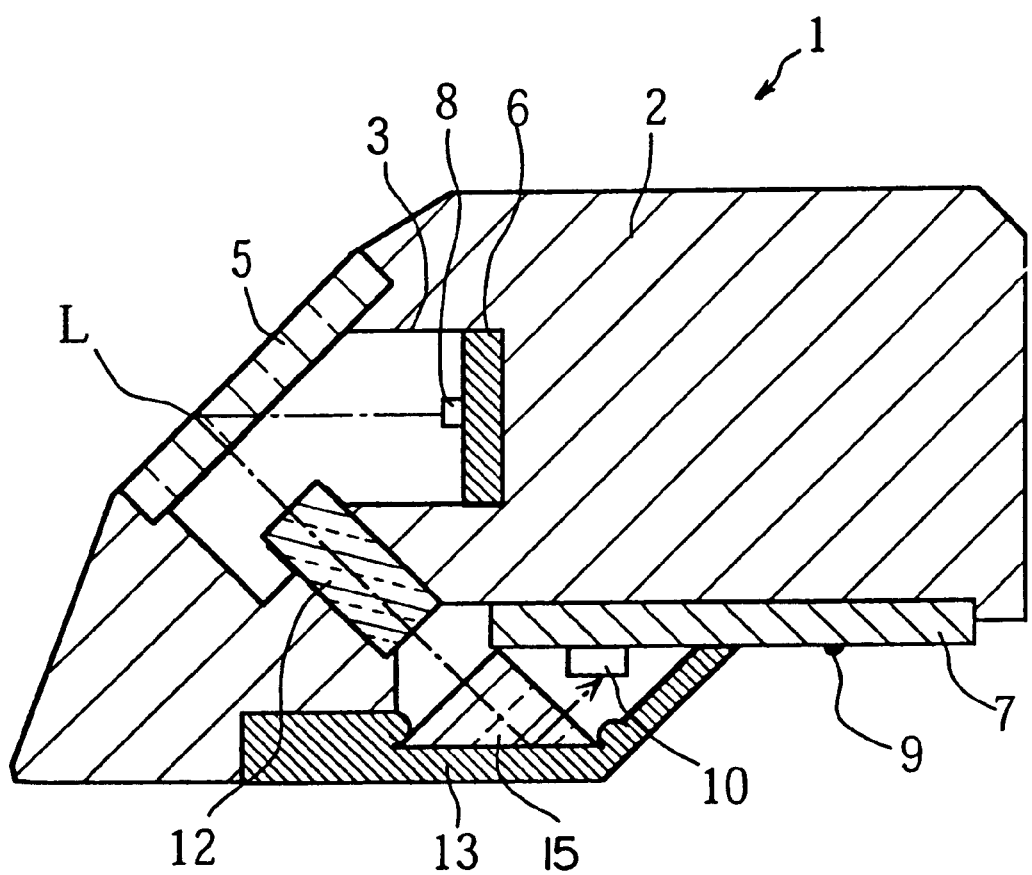
FIG. 22 is a sectional view of a principal portion of the image reading/writing head as a sixth embodiment of the present invention.

The sixth embodiment shown in FIG. 22 is a variation to the first embodiment typically shown in FIG. 2. Here, the reflecting surface formed in the inner surface of the reflecting cover member 13 is replaced by a so called right-angled prism for providing a total reflecting surface. Here again, reflection efficiency can be increased, whereas the physical distance from the lens 12 to the light receiving element can be increased for greater freedom for the location of the integrated circuit 10 formed with the light receiving elements. Further, here again, the prism can be press-fit to the reflecting cover member 13 as shown in FIG. 22 for easier assembling operation.

What is claimed is:

1. An image reading/writing head comprising:

a casing having a document contact portion;

a substrate supported by the casing at a portion thereof different from the document contact portion, said substrate having a main surface facing away from the casing;

a plurality of optical lenses;

a first integrated circuit provided on the substrate and including a plurality of light receiving elements for reading an image on a document by receiving, via said optical lenses, light reflected by the document placed at the document contact portion of the casing;

a plurality of heating elements provided on the substrate for forming an image on recording paper by heat; and a second integrated circuit provided on the substrate for controlling the heating elements;

wherein the first integrated circuit, the heating elements and the second integrated circuit are provided in the main surface of the substrate held by the casing, and wherein the head further comprises a reflecting surface disposed outside the casing outwardly from the main surface of the substrate for making the light after passing the optical lenses enter the light receiving elements.

2. The image reading/writing head according to claim 1, wherein a clock signal for the first integrated circuit and a clock signal for the second integrated circuit are the same clock signal.

3. The image reading/writing head according to claim 1, wherein a direction in which read image signals are transferred in the first integrated circuit is the same as a direction in which image data for recording are transferred in the second integrated circuit, whereby the image can be properly formed on the recording paper when copying the document in which occasion the read image signals are converted into binary information as image data for recording.

4. The image reading/writing head according to claim 1, wherein the first integrated circuit and the second integrated circuit are integrated into a single chip.

5. The image reading/writing head according to claim 1, wherein the substrate supported by the casing is provided, on a side away from the heating elements, with a heat absorbing member made of material which is greater in thermal conductivity than the casing.

6. The image reading/writing head according to claim 1, wherein the optical lenses comprise a selfoc lens array.

7. The image reading/writing head according to claim 1, wherein the optical lenses comprises a plurality of aspherical lenses.

8. The image reading/writing head according to claim 1, wherein the light after passing the optical lenses is reflected only once before entering the light receiving elements.

9. The image reading/writing head according to claim 1, wherein the light after passing the optical lenses is reflected a plurality of times before entering the light receiving element.

10. The image reading/writing head according to claim 1, wherein the reflecting surface includes at least one mirror surface.

11. The image reading/writing head according to claim 10, wherein said at least one mirror surface is formed on an inner surface of a cover member which is separate from the casing, the cover member covering the first integrated circuit and the second integrated circuit.

12. The image reading/writing head according to claim 1, wherein the reflecting surface comprises a prism.

13. The image reading/writing head according to claim 12, wherein the prism is fitted into a cover member covering the first integrated circuit and the second integrated circuit.

* * * * *